United States Patent
Luo et al.

(10) Patent No.: US 11,804,015 B2
(45) Date of Patent: Oct. 31, 2023

(54) METHODS FOR DETERMINING THREE-DIMENSIONAL (3D) PLANE INFORMATION, METHODS FOR DISPLAYING AUGMENTED REALITY DISPLAY INFORMATION AND CORRESPONDING DEVICES

(71) Applicant: SAMSUNG ELECTRONICS CO., LTD., Gyeonggi-do (KR)

(72) Inventors: Zhenbo Luo, Beijing (CN); Shu Wang, Beijing (CN); Xiangyu Zhu, Beijing (CN); Yingying Jiang, Beijing (CN)

(73) Assignee: Samsung Electronics Co., Ltd.

( * ) Notice: Subject to any disclaimer, the term of this patent is extended or adjusted under 35 U.S.C. 154(b) by 99 days.

(21) Appl. No.: 17/290,098

(22) PCT Filed: Oct. 30, 2018

(86) PCT No.: PCT/KR2018/013018
§ 371 (c)(1),
(2) Date: Apr. 29, 2021

(87) PCT Pub. No.: WO2020/091096
PCT Pub. Date: May 7, 2020

(65) Prior Publication Data
US 2021/0398353 A1 Dec. 23, 2021

(51) Int. Cl.
*G06T 19/00* (2011.01)
*G06T 7/11* (2017.01)
(Continued)

(52) U.S. Cl.
CPC .............. *G06T 19/006* (2013.01); *G06T 7/11* (2017.01); *G06T 7/40* (2013.01); *G06V 20/64* (2022.01);
(Continued)

(58) Field of Classification Search
None
See application file for complete search history.

(56) References Cited

U.S. PATENT DOCUMENTS 8,290,264 B2 * 10/2012 Kim ........................ G06T 7/215
382/173
2008/0205716 A1 8/2008 Von Berg et al.
(Continued)

OTHER PUBLICATIONS

PCT/ISA/210 Search Report issued on PCT/KR2018/013018, dated Jul. 30, 2019, pp. 3.
(Continued)

*Primary Examiner* — Martin Mushambo
(74) *Attorney, Agent, or Firm* — The Farrell Law Firm, P.C.

(57) ABSTRACT

The present invention provides a method for determining a plane, a method for displaying Augmented Reality (AR) display information and corresponding devices. The method comprises the steps of: performing region segmentation and depth estimation on multimedia information; determining, according to the result of region segmentation and the result of depth estimation, 3D plane information of the multimedia information; and, displaying AR display information according to the 3D plane information corresponding to the multimedia information. With the method for determining a plane, the method for displaying AR display information and the corresponding devices provided by the present invention, virtual display information can be added into a 3D plane, the reality of the display effect of enhanced display can be improved, and the user experience can be improved.

19 Claims, 12 Drawing Sheets

(51) Int. Cl.
*G06V 20/64* (2022.01)
*G06T 7/40* (2017.01)
*G08G 1/16* (2006.01)

(52) U.S. Cl.
CPC .... *G08G 1/165* (2013.01); *G06T 2207/20081* (2013.01); *G06T 2207/30261* (2013.01)

(56) References Cited

U.S. PATENT DOCUMENTS

| | | |
|---|---|---|
| 2015/0062120 A1 | 3/2015 | Reisner-Kollmann et al. |
| 2017/0193299 A1 | 7/2017 | Cho et al. |
| 2018/0075616 A1 | 3/2018 | Zhao et al. |
| 2018/0189974 A1 | 7/2018 | Clark et al. |
| 2021/0383115 A1* | 12/2021 | Alon .................... G06V 10/764 |

OTHER PUBLICATIONS

PCT/ISA/237 Written Opinion issued on PCT/KR2018/013018, dated Jul. 30, 2019, pp. 8.

* cited by examiner

[Fig. 7]
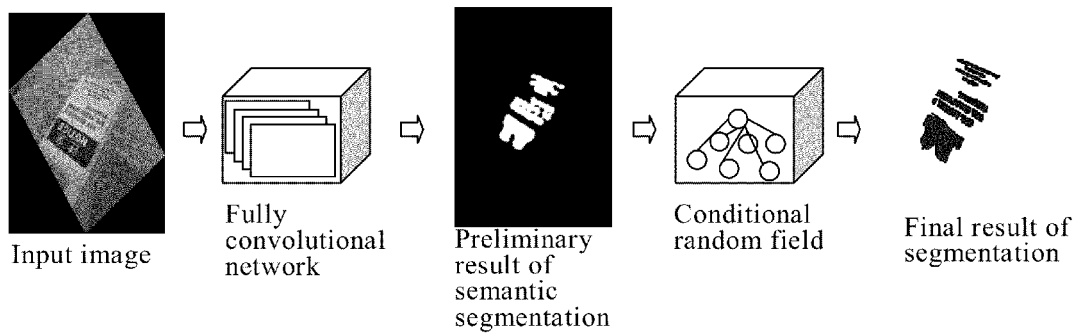
[Fig. 8]
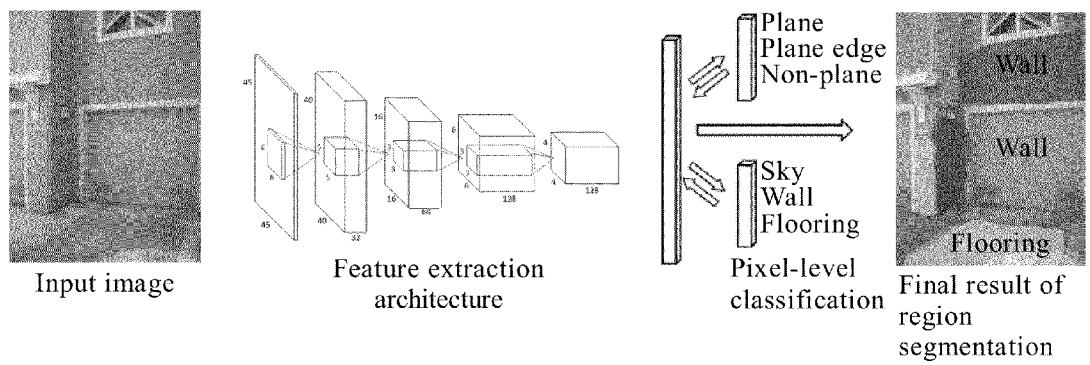
[Fig. 9]
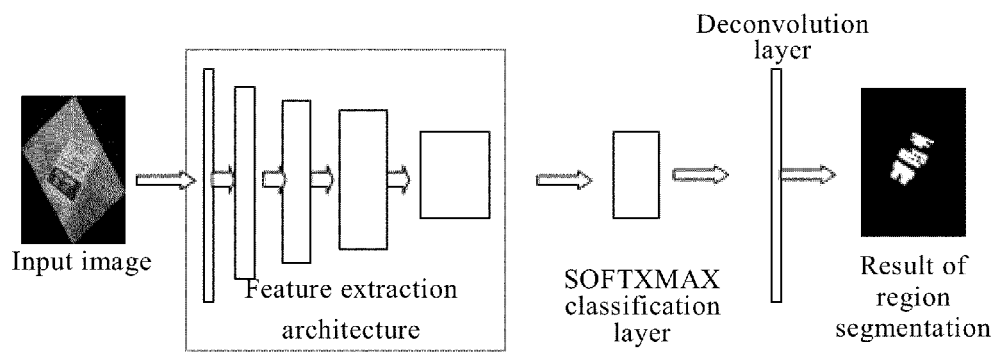
[Fig. 10]
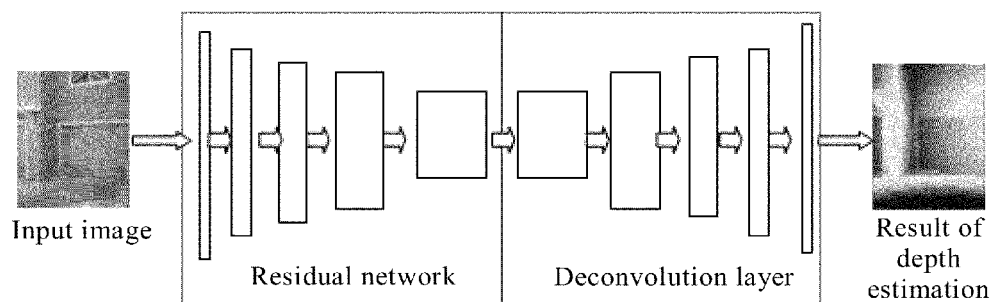

[Fig. 11]
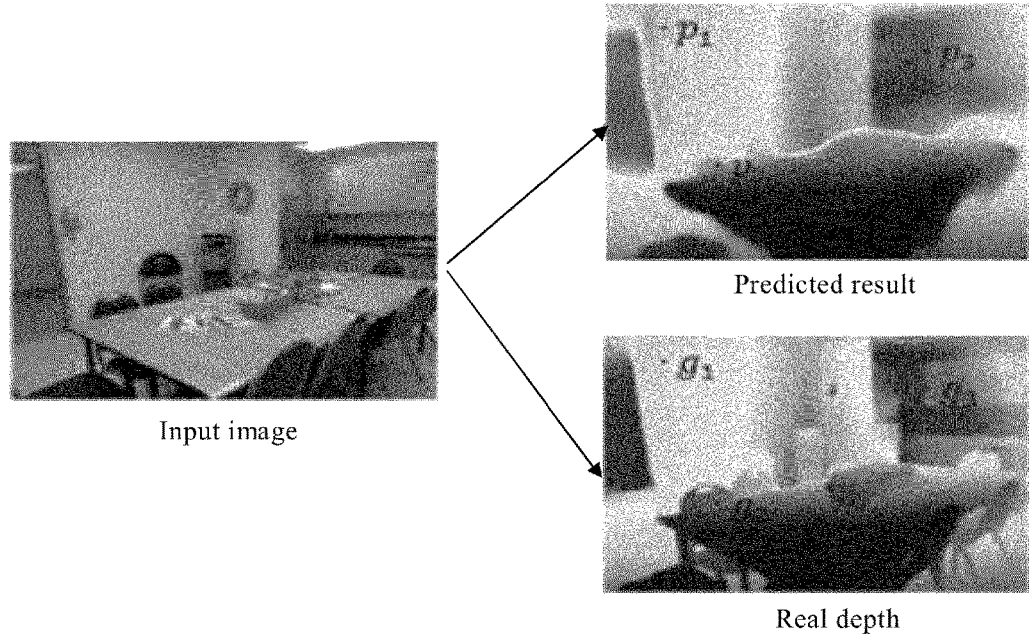
[Fig. 12]
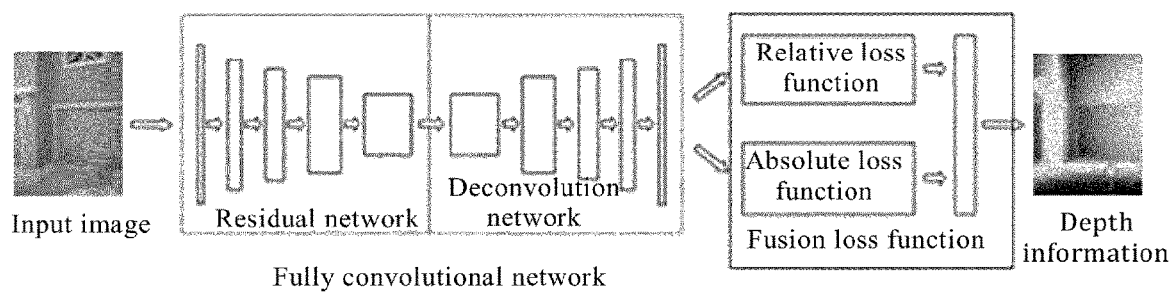
[Fig. 13]
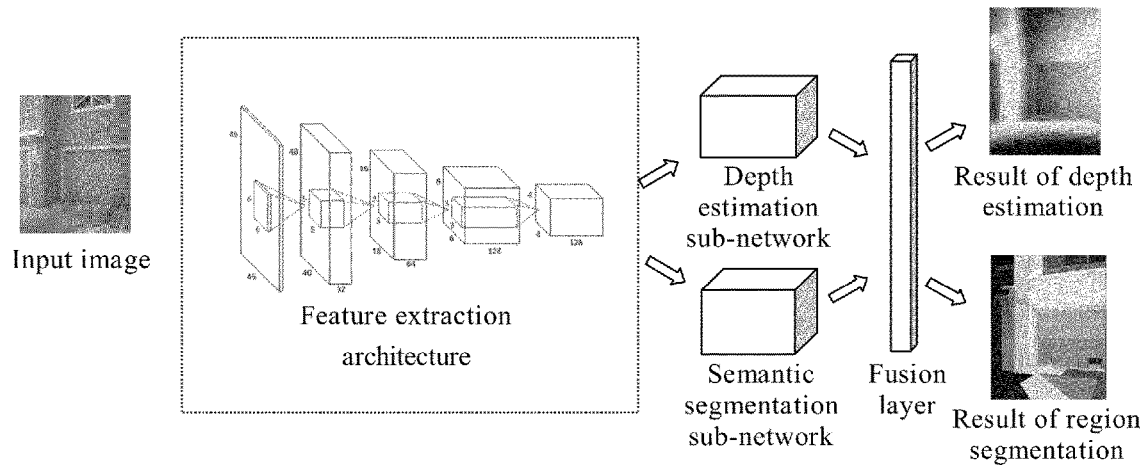

[Fig. 14]
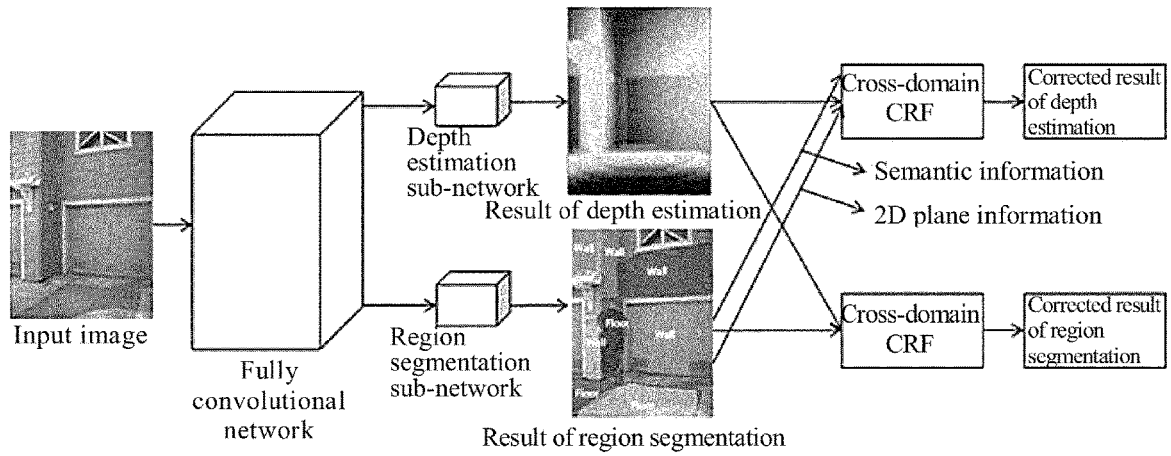
[Fig. 15]
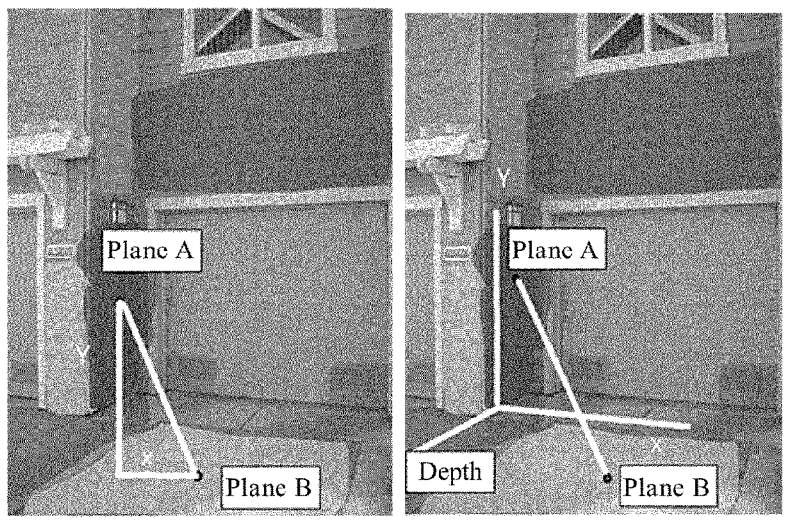
[Fig. 16]
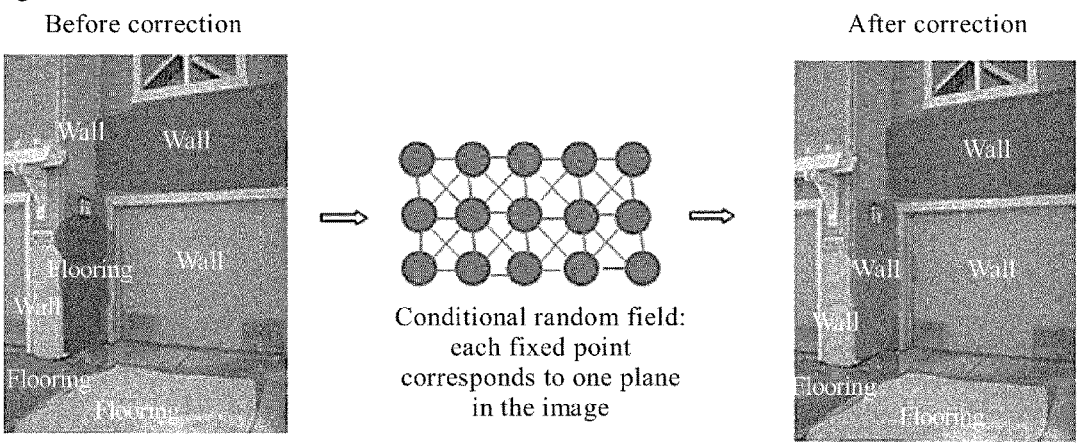

[Fig. 17]
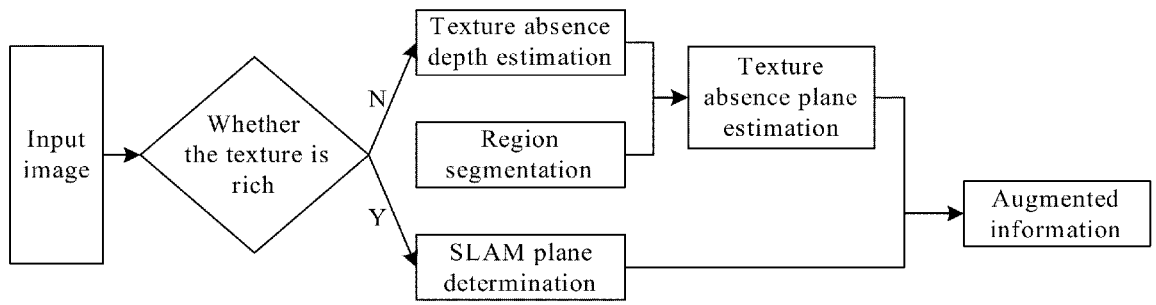
[Fig. 18]
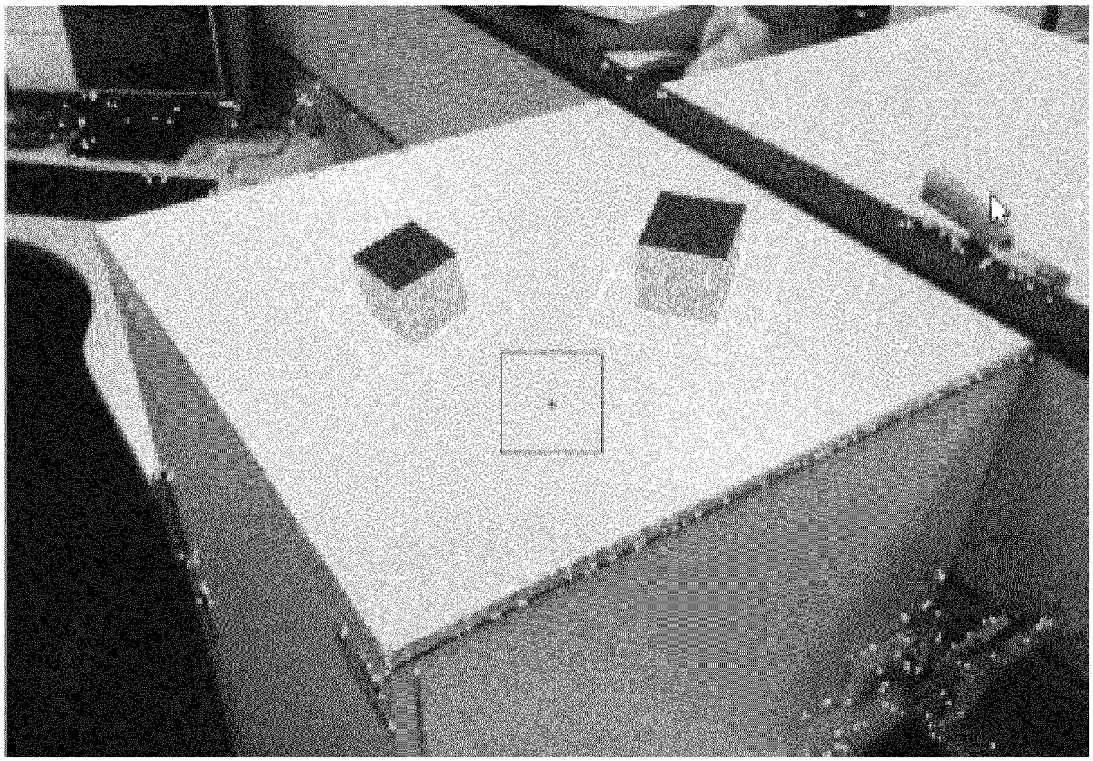
[Fig. 19]
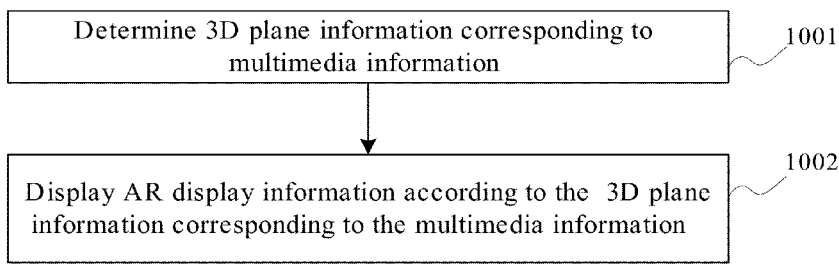

[Fig. 20]
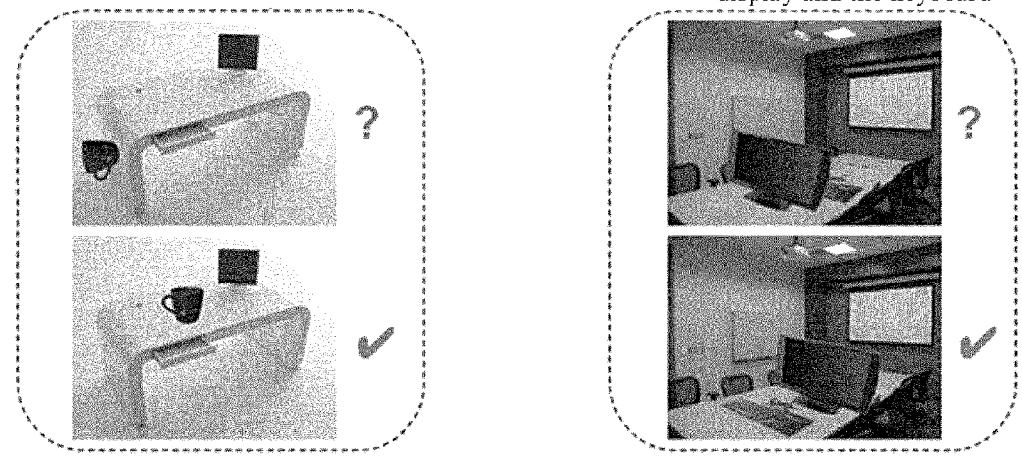
[Fig. 21]
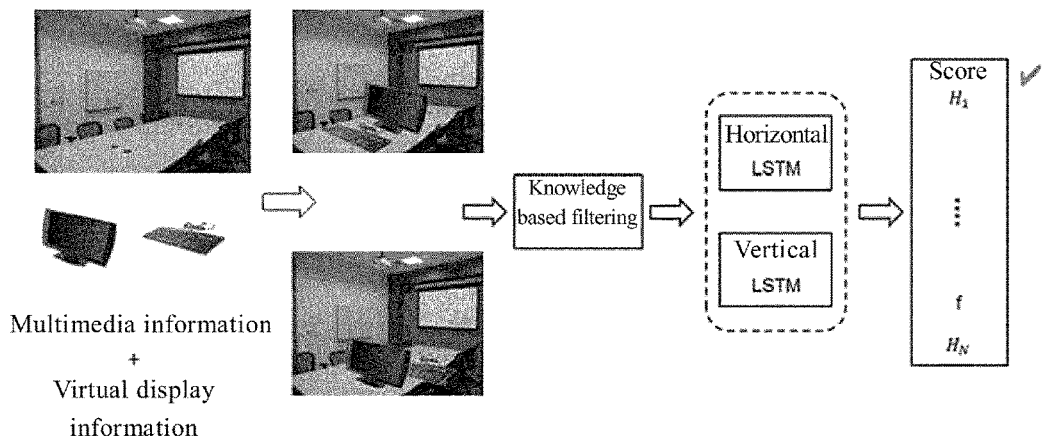
[Fig. 22]
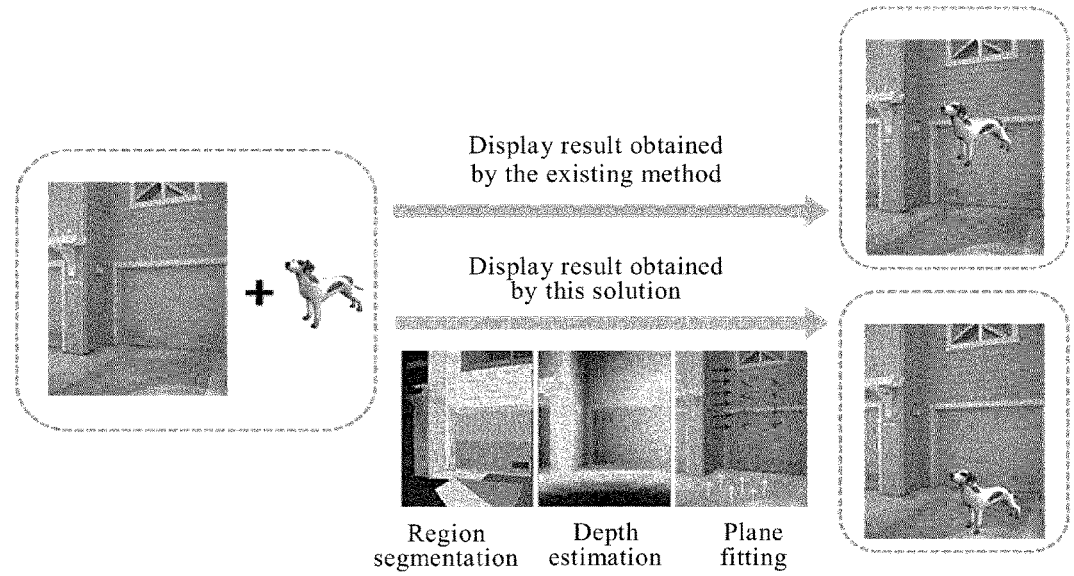

[Fig. 23]
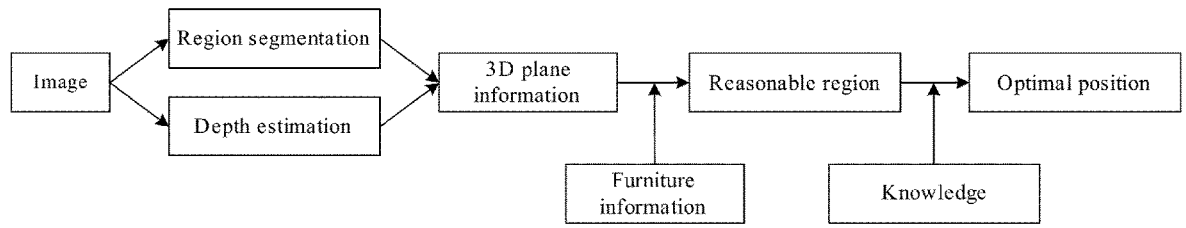
[Fig. 24]
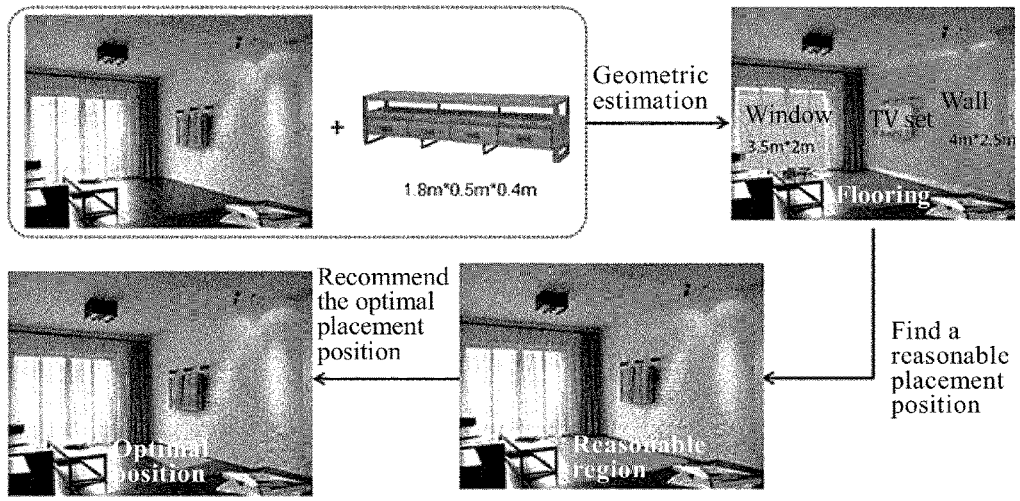
[Fig. 25]
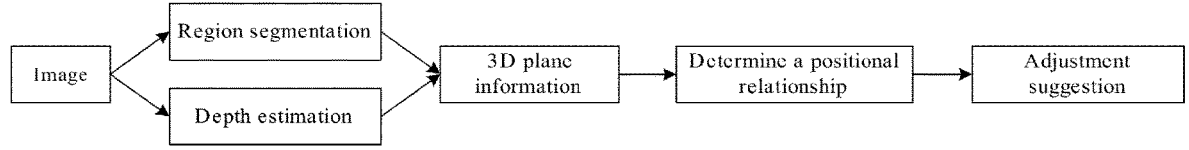
[Fig. 26]
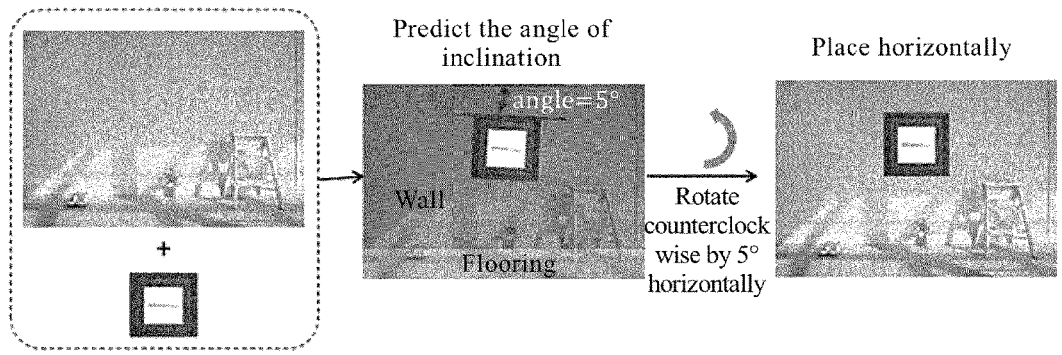

[Fig. 27]
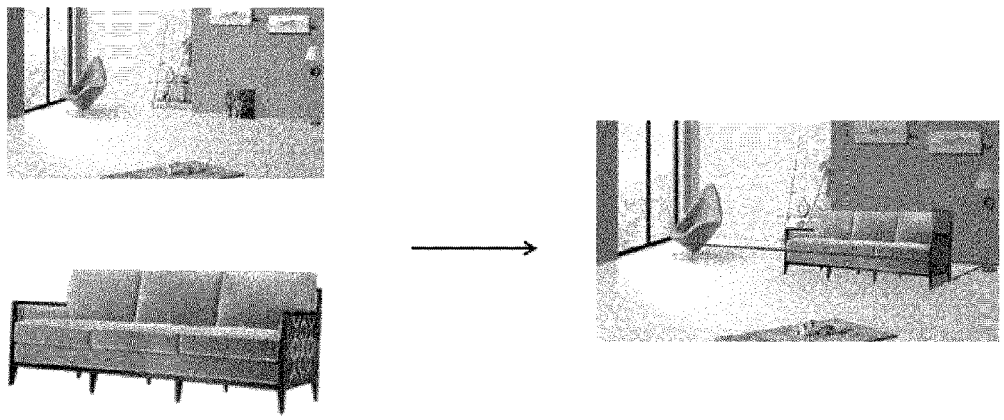
[Fig. 28]
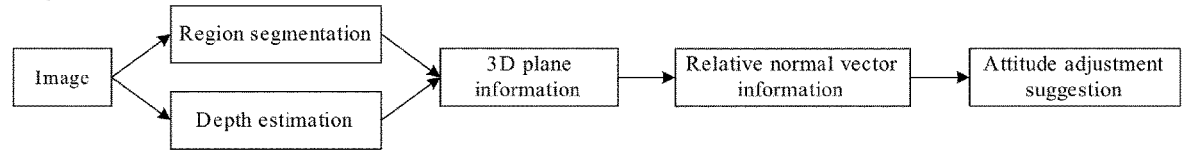
[Fig. 29]
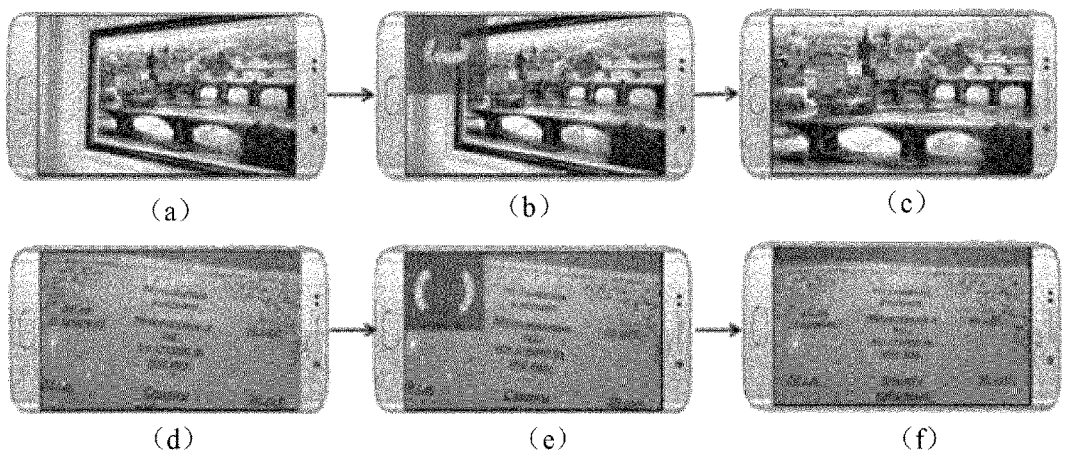
[Fig. 30]
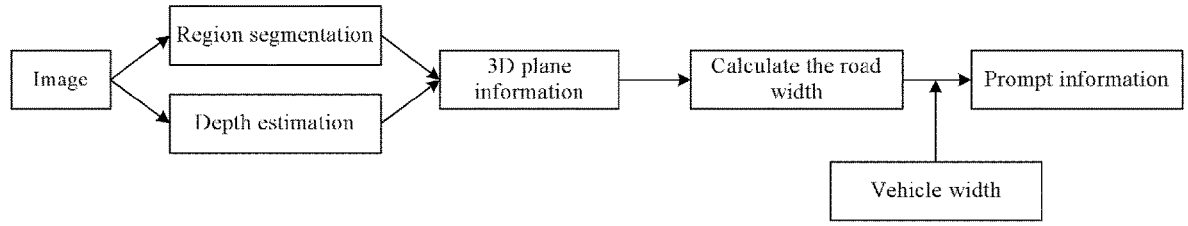

[Fig. 31]
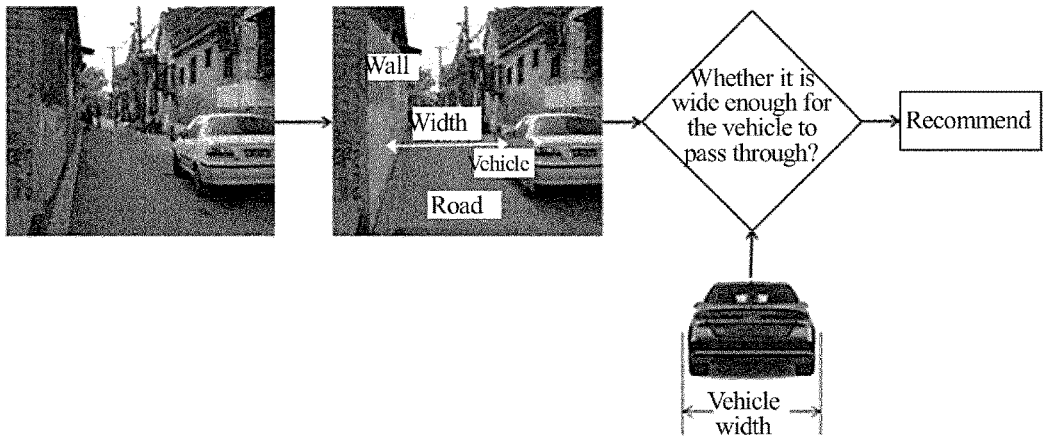
[Fig. 32]
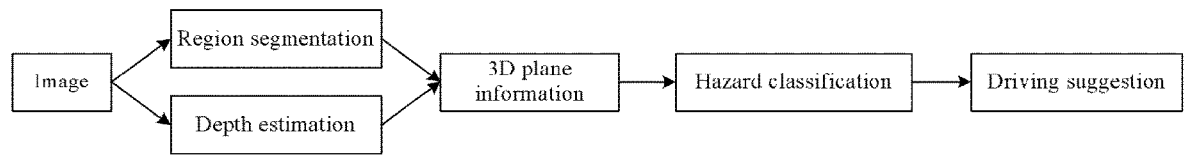
[Fig. 33]
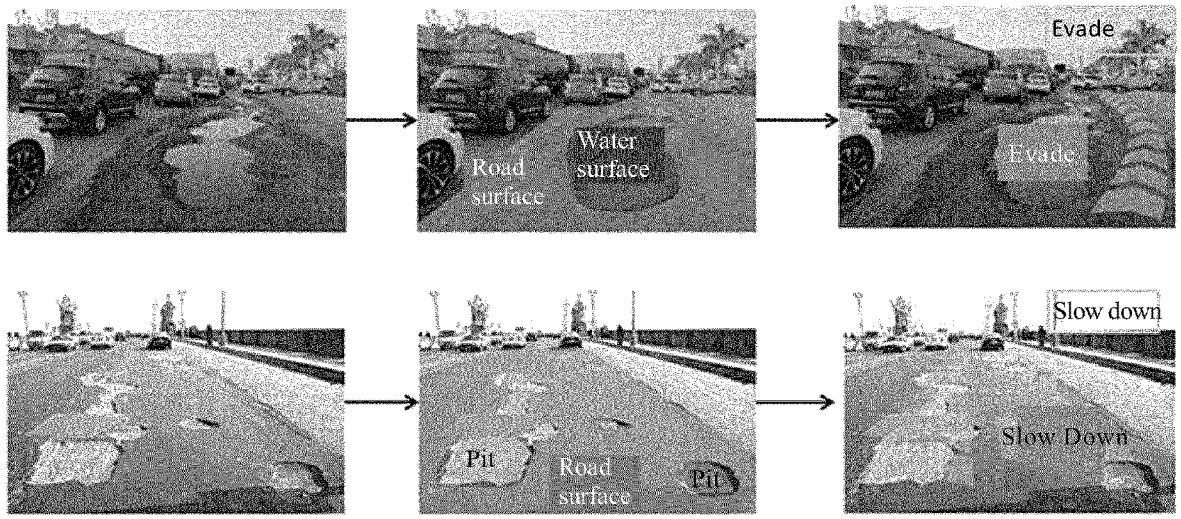
[Fig. 34]
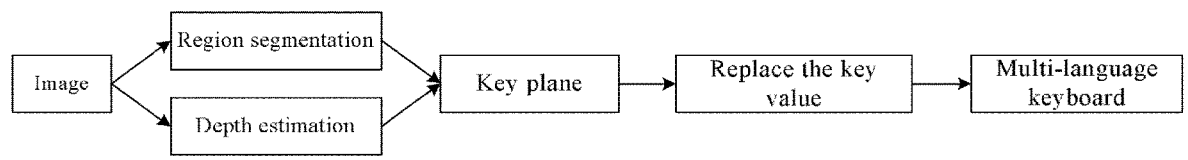

[Fig. 35]
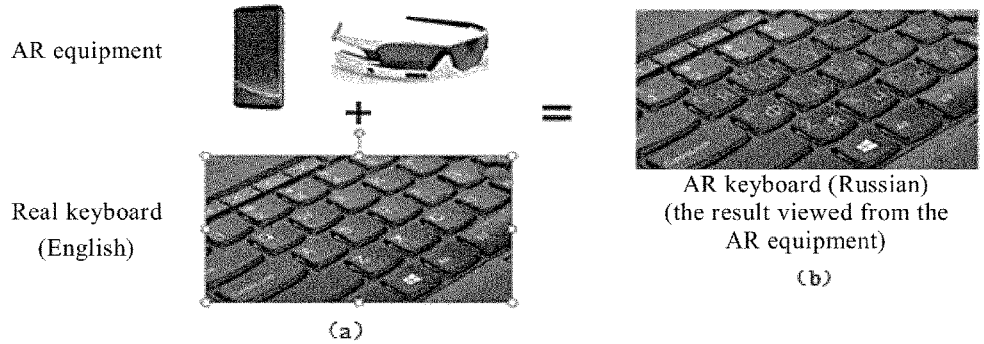
AR equipment
Real keyboard (English)
(a)
AR keyboard (Russian) (the result viewed from the AR equipment)
(b)
[Fig. 36]
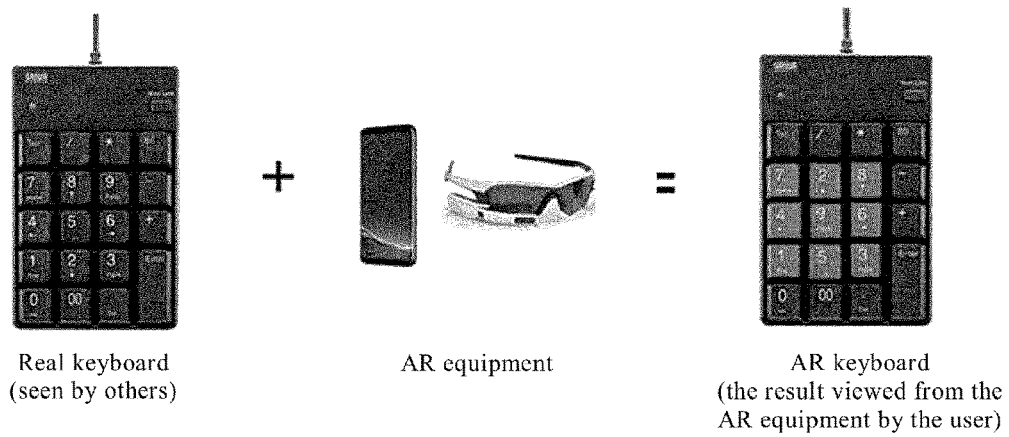
Real keyboard (seen by others)
AR equipment
AR keyboard (the result viewed from the AR equipment by the user)
[Fig. 37]
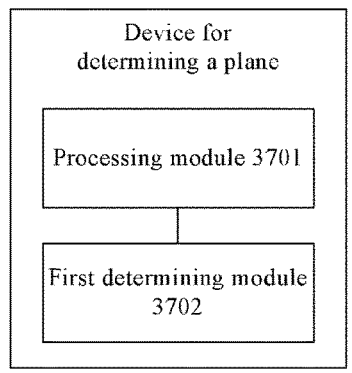
[Fig. 38]
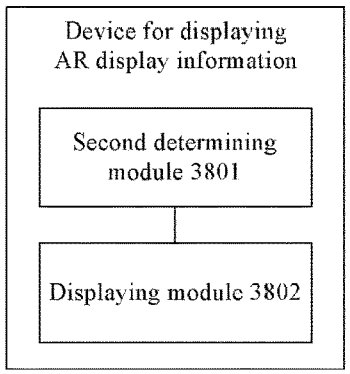

METHODS FOR DETERMINING THREE-DIMENSIONAL (3D) PLANE INFORMATION, METHODS FOR DISPLAYING AUGMENTED REALITY DISPLAY INFORMATION AND CORRESPONDING DEVICES

PRIORITY

This application is a National Phase Entry of International Application No. PCT/KR2018/013018, which was filed on Oct. 30, 2018, the content of which is incorporated herein by reference.

TECHNICAL FIELD

The present invention relates to the technical field of multimedia, and in particular to a method for determining a plane, a method for displaying Augmented Reality (AR) display information and corresponding devices.

BACKGROUND ART

With the Augmented Reality (AR) technology, virtual contents can be superposed to a real scene, so that a user can obtain sensual experience beyond the reality. That is, the user can sense a scene in which real objects and virtual contents coexist. The AR technology can be applied in various fields such as household, tourism translation, shopping, games, navigation and education.

In AR implementation methods in the prior art, generally, virtual contents are directly placed in multimedia information corresponding to a real scene to obtain a result of AR display. However, the result of AR display obtained by the existing methods is less real, and the user experience needs to be improved. As shown in FIG. 1, after a virtual object (e.g., an animal) is placed in the multimedia information corresponding to a real scene, in the result of AR display, this virtual object is suspended in air, which is not in conformity with the true situation. As shown in FIG. 2, after a virtual object is placed in the multimedia information corresponding to a real scene, the virtual object is fitted onto an unreasonable plane (e.g., a vertical wall). As shown in FIG. 3, the displayed virtual navigation route directly extends into the air. As shown in FIG. 4, the displayed virtual navigation route directly runs through a barrier.

DISCLOSURE OF INVENTION

Technical Problem

In conclusion, with the AR implementation methods in the prior art, the result of AR display is not real, and the user experience is poor.

Solution to Problem

To overcome or at least partially solve the technical problems, the following technical solutions are particularly provided.

An embodiment of the present invention provides a method for determining a plane, comprising the steps of:
 performing region segmentation and depth estimation on multimedia information; and
 determining, according to the result of region segmentation and the result of depth estimation, three-dimensional (3D) plane information of the multimedia information.

An embodiment of the present invention provides a device for determining a plane, comprising:
 a processing module configured to perform region segmentation and depth estimation on multimedia information; and
 a first determining module configured to determine, according to the result of region segmentation and the result of depth estimation obtained by the processing module, three-dimensional (3D) plane information of the multimedia information.

An embodiment of the present invention provides a method for displaying Augmented Reality (AR) display information, comprising the steps of:
 determining three-dimensional (3D) plane information corresponding to multimedia information; and
 displaying AR display information according to the 3D plane information corresponding to the multimedia information.

An embodiment of the present invention provides a device for displaying Augmented Reality (AR) display information, comprising:
 a second determining module configured to determine three-dimensional (3D) plane information corresponding to multimedia information; and
 a displaying module configured to display AR display information according to the 3D plane information corresponding to the multimedia information determined by the second determining module.

Advantageous Effects of Invention

The present invention provides a method for determining a plane, a method for displaying AR display information and corresponding devices. Compared with a method for determining a two-dimensional (2D) plane in the prior art, in the present invention, by performing region segmentation and depth estimation on multimedia information and determining a 3D plane of the multimedia information, the determined 3D plane is more accurate; moreover, by displaying AR display information according to the determined 3D plane information, the reality of the result of AR display can be improved, and the user experience can be further improved.

BRIEF DESCRIPTION OF DRAWINGS

The above and/or additional aspects and advantageous of the present invention will become apparent and be more readily appreciated from the following descriptions of embodiments, with reference to the accompanying drawings, in which:

FIG. 7 is a schematic flowchart of the segmentation based on a Fully Convolutional Network (FCN) and a conditional random field according to an embodiment of the present invention;

FIG. 8 is a frame diagram of the integrated region segmentation for simultaneously obtaining plane information and semantic information according to an embodiment of the present invention;

FIG. 9 is a schematic view of a segmentation network architecture according to an embodiment of the present invention;

FIG. 10 is a schematic view of a depth estimation network architecture according to an embodiment of the present invention;

FIG. 11 is a comparison diagram of the predicted result during the training and the real depth of a training sample according to an embodiment of the present invention;

FIG. 12 is a schematic view of an overall framework of a depth estimation network according to an embodiment of the present invention;

FIG. 13 is a schematic view of performing region segmentation and depth estimation in a multitask mode according to an embodiment of the present invention;

FIG. 14 is a schematic view of performing region segmentation and depth estimation in a multitask mode according to an embodiment of the present invention;

FIG. 15 is a comparison diagram of the advantages of the utilization of 3D space information and the utilization of 2D space information during the plane understanding according to an embodiment of the present invention;

FIG. 16 is a schematic view of adjusting the determined 3D plane information according to an embodiment of the present invention;

FIG. 17 is a schematic flowchart of a hybrid method for determining a plane according to an embodiment of the present invention;

FIG. 18 is a schematic view of the result of processing by the hybrid method for determining a plane according to an embodiment of the present invention;

FIG. 19 is a schematic flowchart of a method for displaying AR display information according to an embodiment of the present invention;

FIG. 20 is a schematic view of automatically recommending a display position of virtual display information according to an embodiment of the present invention;

FIG. 21 is a schematic view of realizing automatic recommendation by a knowledge based filtering system and a long short term memory network (LSTM) according to an embodiment of the present invention;

FIG. 22 is a comparison diagram of the AR display information generated in the prior art and the AR display information generated in the present invention;

FIG. 23 is a schematic view of a specific flow of automatically recommending a display position of virtual display information according to an embodiment of the present invention;

FIG. 24 is a schematic view of automatically recommending a display position of virtual display information according to an embodiment of the present invention;

FIG. 25 is a schematic flowchart of a method for recommending plane position adjustment according to an embodiment of the present invention;

FIG. 26 is a schematic view of a first recommendation for plane position adjustment according to an embodiment of the present invention;

FIG. 27 is a schematic view of a second recommendation for plane position adjustment according to an embodiment of the present invention;

FIG. 28 is a schematic flowchart of a method for recommending attitude adjustment of a collection equipment according to an embodiment of the present invention;

FIG. 29 is a schematic view of the method for recommending attitude adjustment of a collection equipment according to an embodiment of the present invention;

FIG. 30 is a schematic flowchart of displaying driving assistance prompt information according to an embodiment of the present invention;

FIG. 31 is a schematic view of displaying driving assistance prompt information according to an embodiment of the present invention;

FIG. 32 is a schematic flowchart of a method for estimating a road condition in a driving assistance system according to an embodiment of the present invention;

FIG. 33 is a schematic view of the method for estimating a road condition in a driving assistance system according to an embodiment of the present invention;

FIG. 34 is a flowchart of a method for realizing an AR keyboard according to an embodiment of the present invention;

FIG. 35 is a schematic view of a multi-language AR keyboard according to an embodiment of the present invention;

FIG. 36 is a schematic view of an encrypted password keyboard according to an embodiment of the present invention;

FIG. 37 is a schematic structure diagram of a device for determining a plane according to an embodiment of the present invention; and FIG. 38 is a schematic structure diagram of a device for displaying AR display information according to an embodiment of the present invention.

MODE FOR THE INVENTION

Figure 1:
FIG. 1 is a schematic view of a display result of AR display information in the prior art.
Figure 2:
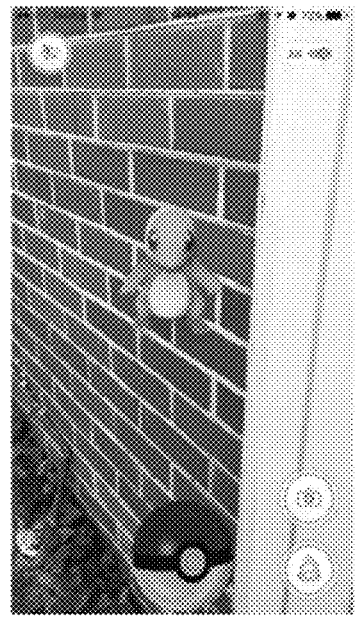
FIG. 2 is a schematic view of another display result of AR display information in the prior art.
Figure 3:
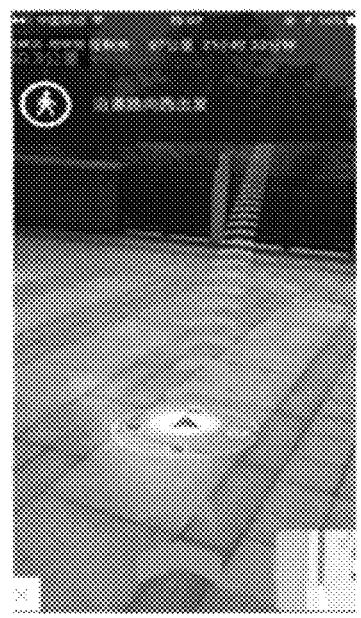
FIG. 3 is a schematic view of still another display result of AR display information in the prior art.
Figure 4:
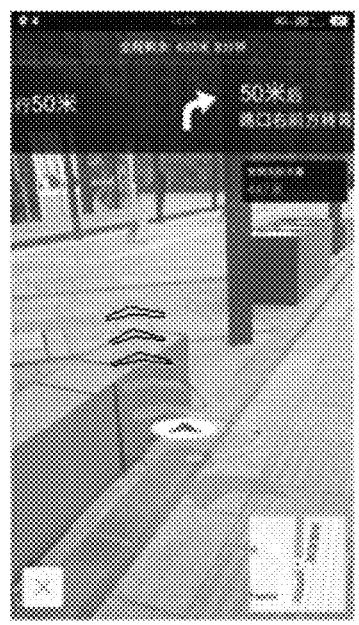
FIG. 4 is a schematic view of yet another display result of AR display information in the prior art.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

Embodiment 1

Figure 5:
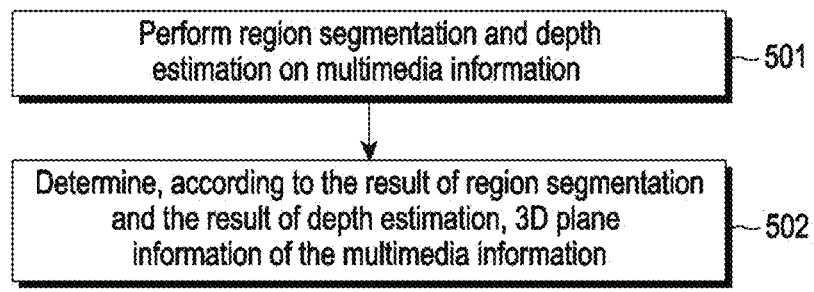
FIG. 5 is a schematic flowchart of a method for determining a plane according to an embodiment of the present invention.

This embodiment of the present invention provides a method for determining a plane, as shown in FIG. 5, comprising the following steps.

Step 501: Region segmentation and depth estimation are performed on multimedia information.

The multimedia information in this embodiment of the present invention comprises: an image and/or a video or more.

In addition, the multimedia information in this embodiment of the present invention can be, but not limited to, monocular multimedia information, for example, multimedia information collected by one multimedia-information collection equipment (e.g., a camera).

In this embodiment of the present invention, the result of region segmentation can contain two-dimensional (2D) plane information. Region segmentation is performed on the multimedia information by, but not limited to, a deep learning network to obtain 2D plane information. The step 501 specifically comprises the following step 5011 (not shown).

Step 5011: Region segmentation is performed, by a deep learning network trained by plane labeling, on the multimedia information to obtain the result of region segmentation (2D plane information).

The deep learning network is trained by the following way: performing plane labeling on a training sample, and training the deep learning network according to the labeled training sample In this embodiment of the present invention, the result of region segmentation can further contain semantic information corresponding to the 2D plane information. Region segmentation is performed on the multimedia information by, but not limited to, a deep learning network to obtain the 2D plane information and the semantic information corresponding to the 2D plane information. 2D plane recognition and semantic recognition can be performed by different deep learning networks to obtain the 2D plane information and the semantic information corresponding to the 2D plane information, respectively.

In addition, region segmentation can also be performed on the multimedia information by a unified deep learning network. That is, 2D plane recognition and semantic recognition are simultaneously performed by a unified deep learning network, to simultaneously obtain the 2D plane information and the semantic information corresponding to the 2D plane information. The step 501 specifically comprises the following step 5012 (not shown).

Step 5012: Region segmentation is performed, by a deep learning network trained by both semantic labeling and plane labeling, on the multimedia information to obtain the result of region segmentation (the 2D plane information and the semantic information corresponding to the 2D plane information).

The deep learning network is trained by the following way: performing sematic labeling and plane labeling on a training sample, and training the deep learning network according to the labeled training sample In the steps 5011 and 5012, during training the deep learning network according to the labeled training sample, a target function and a network structure of the deep learning network can be determined first, and the deep learning network is then trained according to the labeled training sample as well as the target function and the network structure.

In this embodiment of the present invention, in the steps 5011 and 5012, during the training of the deep learning network, pixel-level labeling (e.g., semantic labeling or plane labeling) can be performed on the training sample. The semantic labeling uses a semantic object as a unit to label this semantic object at a specific position in the multimedia information (the multimedia information will be described by taking an image as example hereinafter); and the pixel-level semantic labeling is to ensure the specific position accurate to a pixel level and semantically label each pixel point in an image serving as the training sample. For example, if a vehicle is selected as a semantic object, all pixel points belong to the vehicle in an image are labeled as identical semantic information (e.g., a semantic attribute identifier). In this embodiment of the present invention, the plane labeling uses a plane as a unit to label pixel points belong to each plane in an image as identical plane information. For example, if an image contains N planes and each plane consist of a number of pixel points, the pixel points in a same plane correspond to a same piece of plane information.

Since semantic labeling and plane labeling have been performed on each pixel point during the training of the deep learning network, when region segmentation is performed on the multimedia information by the deep learning network, the result of plane recognition and the result of semantic recognition for each pixel point can be obtained, and the 2D plane information and the semantic information corresponding to the 2D plane information can be determined according to the result of plane recognition and the result of semantic recognition for each pixel point.

The unified deep learning network trained by the above way can also be referred to as a deep learning network obtained by end-to-end training.

During the plane labeling of a pixel point, the plane information corresponding to this pixel point comprises a classification identifier and/or a plane identifier. The classification identifier comprises at least one of the following: a classification identifier corresponding to a plane, a classification identifier corresponding to a plane edge and a classification identifier corresponding to a non-plane. When the pixel point belongs to a certain plane, the plane information of this pixel point comprises a classification identifier corresponding to this plane and a plane identifier of the plane of the pixel point; when the pixel point does not belong to any plane, the plane information of this pixel point comprises a classification identifier corresponding to a non-plane; and, when the pixel point is located on a plane edge, the plane information of this pixel comprises a classification identifier corresponding to the plane edge and a plane identifier of a plane corresponding to the plane edge.

Unlike the simple region segmentation, the region segmentation in this embodiment of the present invention can be considered as plane classification rather than segmentation in the prior art. Since each pixel point is labeled with a classification identifier during the training of the deep learning network, the pixel points can be classified by the trained deep learning network, and points eventually classified into "planes" can form a connected 2D plane, so as to obtain the 2D plane information.

Figure 6:
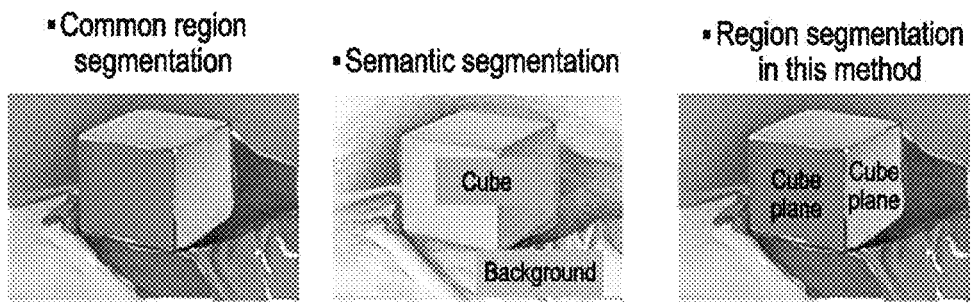
FIG. 6 is a schematic view of a result of the segmentation combining semantic labeling and plane labeling according to an embodiment of the present invention.

In this embodiment of the present invention, by the semantic labeling and plane labeling, dual attributes can be given to the training sample, and each pixel point in the training sample corresponds to a semantic label and a plane label. For example, as shown in FIG. 6, FIG. 6(*a*) shows an ordinary region segmentation method where planes in an image can be segmented but semantic information corresponding to each plane cannot be determined; FIG. 6(*b*) shows an ordinary semantic segmentation method where image contents can be classified into cube and background but planes of the cube cannot be specifically distinguished; and, FIG. 6(*c*) shows the region segmentation method in this embodiment of the present invention, where both the plane information and the semantic information corresponding to a plane can be obtained. Specifically, for a cube, the six sides of the cube correspond to the same semantic label; for any pixel point in the cube, each pixel point is labeled with a same sematic attribute by semantic labeling; and in combination with the plane labeling, six planes of the cube can be further segmented. In this embodiment of the present invention, the dual attributes facilitate the refinement of the segmentation of multimedia information, so that a result more meaningful than that of the simple semantic segmentation or simple region segmentation is obtained.

The framework of the semantic segmentation mentioned above will be descried below in detail. The deep learning network can be a Fully Convolutional Network (FCN). The framework of the whole segmentation flow is based on the FCN and a Conditional Random Field (CRF). As shown in FIG. 7, the input image and the target of semantic segmentation are determined first. The target of semantic segmentation in this image is defined as words, and a preliminary result of semantic segmentation is obtained by dense prediction based on the FCN. The preliminary result of semantic segmentation corresponds to a portion containing the words in the input image, and the FCN employs an atrous structure both in a convolutional layer and a pyramid pooling layer to reduce the side-effect of down-sampling and realize multi-scale feature extraction, so that the result of semantic segmentation can be more robust and the network can be easier to train. Since there is still partial adhesion and blur in the preliminary result of semantic segmentation, by using a conditional random field and by setting illumination, color, contrast and other image information as parameters of decision conditions, a more accurate final result of segmentation can be obtained.

In this embodiment of the present invention, the integrated region segmentation framework (also referred to as a multi-task region segmentation architecture) capable of simultaneously obtaining plane information and semantic information is based on the semantic segmentation architecture. In the multi-task region segmentation architecture, the task of determining plane information is formulated as pixel-level classification, rather than traditional image processing, so that the plane information can be acquired by the semantic segmentation architecture. As shown in FIG. 8, an image is input first; and, after passing through a feature extraction architecture consisting of an FCN, two kinds of pixel-level classifications are performed on each pixel point. The first pixel-level classification is plane classification, i.e., determining whether the pixel point is in a plane, on a plane edge or in a non-plane; and the second pixel-level classification is semantic classification, i.e., determining the semantic attribute to which the pixel point belongs, for example, sky, wall, flooring or more. Eventually, the final result of region segmentation containing both the 2D plane information and the corresponding semantic information is obtained.

In the step of performing depth estimation on the multimedia information, in this embodiment of the present invention, the accuracy of the depth estimation can be improved by using the difference information between previous and following time frames in the monocular multimedia information (multimedia information acquired by a monocular camera). Specifically, if the depth estimation is performed by using single-frame multimedia information, only spatial correlation information can be obtained; however, if the depth estimation is performed by using multimedia information in previous and following time frames, not only the spatial correlation information can be obtained, but also the temporal correlation information at each position in the multimedia information can be obtained. The temporal correlation information can be used for correcting the result of depth estimation. For example, when there is a prominent difference (greater than a set threshold) in the result of depth estimation at a same position (for example, a same pixel point) of the previous and following frames, the result of depth estimation on the current frame can be corrected by using the result of depth estimation on the previous frame.

In this embodiment of the present invention, the region segmentation and the depth estimation can be performed in a single-task mode respectively, specifically: the result of region segmentation is obtained by a deep learning network (which can be referred to as a segmentation network) corresponding to the region segmentation, the result of depth estimation is obtained by a deep learning network (which can be referred to as a depth estimation network) corresponding to the depth estimation, and 3D plane fitting is further performed according to the respectively obtained result of region segmentation and the result of depth estimation to obtain 3D plane information.

In this embodiment of the present invention, the segmentation network and the depth estimation network are shown in FIGS. 9 and 10. Specifically, referring to FIG. 9, for the segmentation network, an image is input first, feature information is extracted by several feature extraction architectures, the result of segmentation is classified by a SOFTXMAX classification layer, and the image is recovered to the size of the original image by one deconvolution layer to obtain the pixel-level result of segmentation.

Referring to FIG. 10, the first half of the depth estimation network is similar to the segmentation network, wherein feature extraction is performed by using a plurality of residual networks as feature extraction architectures and then the image is gradually recovered to the half size of the original image after passing through a series of deconvolutional layers, and the final result can be continuously distributed in form of a heat map.

During the training of the depth estimation network, training can be performed according to the real depth of the training sample and by a triplet loss function consisting of an absolute loss function, a relative loss function and a fusion loss function. FIG. 11 shows a comparison diagram between the predicted result (predicted depth information map) during the training for the input image and the real depth of the training sample.

Specifically, in this embodiment of the present invention, the overall framework of the depth estimation network can be based on an FCN, as shown in FIG. 12, wherein the depth estimation network mainly consists of a 50-layer residual network (ResNet-50) in the first half portion of the FCN and a deconvolutional network in the second half portion of the FCN. During the training process, by adopting a triplet loss function, the accuracy of the depth estimation is improved, and the result of training is optimized. Image information is input first, and feature extraction is then performed on the image by the ResNet-50. In the feature extraction process, several layers in the residual network are connected by skipping connection. Then, deconvolution is performed on the extracted feature by the deconvolutional network until the size of the extracted feature is half of the size of the original image. In the deconvolution process, the skipping connection is also employed. The output result is up-sampled to obtain the result of depth estimation in one-to-one correspondence to the pixels of the original image, so that the depth information corresponding to each pixel point in the pixels of the original image is eventually obtained. The result of depth estimation can be continuously distributed in form of a heat map.

In this embodiment of the present invention, after the result of region segmentation and the result of depth estimation are obtained, the result of depth estimation can be further corrected according to the result of region segmentation; and/or, the result of region segmentation can be further corrected according to the result of depth estimation.

The result of region segmentation and the result of depth estimation can be obtained in the single-task mode.

In addition, in this embodiment of the present invention, region segmentation and depth estimation can be performed in a multitask mode. Region segmentation and depth estimation are performed on the multimedia information by a unified deep learning network; and, the result of depth estimation is corrected according to the result of region segmentation and the result of region segmentation is corrected according to the result of depth estimation, so as to obtain the corrected result of region segmentation and result of depth estimation.

Specifically, referring to FIG. 13, feature extraction is performed on the input image (multimedia information) by feature extraction architectures to obtain multi-level feature information. Since only one feature extraction is required for a subsequent depth estimation sub-network and a region segmentation sub-network and it is unnecessary to perform feature extraction separately, the depth estimation sub-network and the region segmentation sub-network could share computation. According to the extracted multi-level feature information, a result of region segmentation (this result is a preliminary result) corresponding to the region segmentation sub-network is obtained by the region segmentation sub-network; and, according to the multi-level feature information, a result of depth estimation (this result is a preliminary result) corresponding to the depth estimation sub-network is obtained by the depth estimation sub-network. The result of region segmentation corresponding to the region segmentation sub-network and the result of depth estimation corresponding to the depth estimation sub-network are fused by a fusion layer (the result of depth estimation is corrected according to the result of region segmentation, and the result of region segmentation is corrected according to the result of depth estimation), to obtain the corrected result of region segmentation and the corrected result of depth estimation.

The two sub-networks (i.e., the region segmentation sub-network and the depth estimation sub-network) can be logical sub-networks. In an actual network architecture, the two sub-networks can be used as a whole, i.e., one network; or, the two sub-networks can be used as two individual networks.

Further, the depth estimation sub-network and the region segmentation sub-network are trained by the following way: training the depth estimation sub-network by using a deep learning network (which can be, but not limited to, a residual network) as a pre-training model; training the region segmentation sub-network by using the trained depth estimation sub-network as a pre-training model; training the fusion layer of the deep learning network by using the trained region segmentation sub-network as a pre-training model; and, training the depth estimation sub-network and the region segmentation sub-network by using the trained fusion layer of the deep learning network as a pre-training model.

The depth estimation sub-network and the region segmentation sub-network can also be trained by the following way:

training the region segmentation sub-network by using a deep learning network (which can be, but not limited to, a residual network) as a pre-training model; training the depth estimation sub-network by using the trained region segmentation sub-network as a pre-training model; training the fusion layer of the deep learning network by using the trained depth estimation sub-network as a pre-training model; and, training the region segmentation sub-network and the depth estimation sub-network by using the trained fusion layer of the deep learning network as a pre-training model.

Preferably, during the training of the region segmentation sub-network, the region segmentation sub-network can also be trained by the way mentioned above and in combination with the plane labeling alone or both the plane identification and semantic labeling.

For example, by using a residual network as a pre-training model, the learning rate of the region segmentation sub-network is set to 0, back-propagation is performed on only the depth estimation sub-network, and network parameters of the depth estimation sub-network are optimized according to the unilateral training. That is, the initial learning rate of the depth estimation sub-network is set to 0.01, and the depth estimation sub-network is trained for about 100000 iterations. Then, by using the depth estimation sub-network trained in the above step as a pre-training model, the learning rate of the depth estimation sub-network is set to 0, and network parameters of the segmentation sub-network are optimized unilaterally, wherein the learning rate and the number of times of training are the same as those described above. Then, by using the result obtained in the previous step as a pre-training model, both the learning rate of the segmentation sub-network and the learning rate of the depth estimation sub-network are set to 0, and parameter information of the final fusion layer is trained. Then, by using the result obtained in the previous step as a pre-training model, the learning rates of all the sub-networks are set to be normal, that is, the overall learning rate is set to 0.001, and training is performed for 100000 iterations to obtain the final result.

The advantages of performing depth estimation and region segmentation in a multitask mode will be described below.

1. As for sharing computation: in the single-task processing mode, both the depth estimation network and the region segmentation network are problem of densely prediction based on an FCN, so both of them have a very high similarity in the network structure, with a significant difference only in the learning target. In this embodiment of the present invention, in terms of the high similarity of these two networks, the goal of sharing computation between depth estimation and semantic segmentation could be achieved by multi-task learning framework, so that the computing speed can be increased and the accuracy of the result of processing can also be improved.

2. As for dependency: the result of depth estimation and the result of region segmentation are mutually benefit and restrictive. For example, if the depth information within a certain region does not change obviously, this region is likely to be a plane; conversely, if a certain region is a plane, the depth information tends to change continuously and smoothly. Comprehensively considering the above two points, the region segmentation and the depth estimation are performed by a unified deep learning network to realize multitask prediction, so that the result of depth estimation and the result of region segmentation are obtained simultaneously. Accordingly, the computation can be shared, the speed can be increased. Moreover, the result of depth estimation and the result of region segmentation can be mutually benefit and restrictive, so that the robustness of the final result can be improved.

If the result of region segmentation of the region segmentation sub-network contains the 2D plane information and the semantic information corresponding to the 2D plane information, during the correction of the result of depth estimation according to the result of region segmentation, the result of depth estimation can be corrected according to the 2D plane information and the semantic information, so that a more accurate result of depth estimation can be obtained. For example, if there is a window region in an image, during the depth estimation of the window region, due to the transparency of glass, the obtained result of depth estimation is likely to be the depth of an object outside the window rather than the depth of the window region itself. If the result of depth estimation can be corrected according to the semantic information of this region, a more accurate result of depth estimation can be obtained. For another example, for a wall and a picture on the wall, it can be determined from the semantic information that there is a small difference between the depth of the wall and the depth of the picture on the wall. Therefore, according to the simple judgment of depth difference, the result of depth estimation can be corrected, and the accuracy of the result of depth estimation is thus improved.

As shown in FIG. 14, an image is input, and multi-level feature information is extracted by using an FCN as feature extraction architecture; a result of region segmentation (this result is a preliminary result) corresponding to the region segmentation sub-network is obtained according to the extracted multi-level feature information by the region segmentation sub-network, wherein the result of region segmentation contains 2D plane information and corresponding semantic information; and a result of depth estimation (this result is a preliminary result) corresponding to the depth estimation sub-network is obtained according to the multi-level feature information by the depth estimation sub-network, and, the result of region segmentation can be corrected according to the result of depth estimation by a cross-domain conditional random field, and the result of depth estimation can be corrected according to the result of region segmentation (the 2D plane information and the corresponding semantic information) to obtain the corrected result of region segmentation and the corrected result of depth estimation, so that the more accurate result is obtained.

In this embodiment of the present invention, by adopting a novel network structure, the depth information and the result of region segmentation can be predicted simultaneously as well as sharing computation. Specifically, image information is input first, higher-level features are extracted iteratively by a deep residual network, and features in multiple levels are fused by addition or other ways to obtain feature map information containing multi-level information. Then, the multi-level feature map information is used in the sharing computation of the depth estimation and the region segmentation. The depth estimation sub-network and the segmentation sub-network learn respective depth information and plane information (can also include semantic information), and the two kinds of information are fused by one network layer, so that the result of depth estimation and the result of region segmentation are predicted simultaneously and the purpose of the multi-task learning/prediction is achieved.

Step 502: 3D plane information of the multimedia information is determined according to the result of region segmentation and the result of depth estimation.

During the determination of the 3D plane information, 3D plane fitting can be performed according to the result of region segmentation and the result of depth estimation so as to obtain 3D plane information of the multimedia information.

In this embodiment of the present invention, after the step 5502, the method can further comprise a step of adjusting the determined 3D plane information according to semantic information and spatial relationship information corresponding to the determined 3D plane information.

Specifically, an association between 3D planes is determined according to semantic information and spatial relationship information corresponding to the determined 3D plane information, and the determined 3D plane information is adjusted by the determined association to correct the wrong 3D plane information.

Unlike the utilization of only 2D plane information in the prior art, the association utilizes the spatial relationship information and semantic information of the 3D plane; and, the spatial relationship in this embodiment of the present invention is expanded to three dimensions and utilizes the result of depth estimation estimated in the step 501. Compared with the spatial relationship of a 2D plane, the spatial relationship of a 3D plane can reflect the exact positions of planes realistically. FIG. 15(*a*) shows a schematic view of a 2D spatial relationship where the plane A is located above the plane B; and, FIG. 15(*b*) shows a schematic view of a 3D spatial relationship where the plane A is perpendicular to the plane B in the real spatial relationship.

The association between 3D planes can be realized by a conditional random field. Specifically, each 3D plane is treated as a fixed point, and all the fixed points are connected to form a directed graph; and then, the conditional random field is used as a basic framework, the conditional relationship is set as a 3D spatial relationship and a semantic relationship, and the plane information and semantic information of each plane are corrected. As shown in FIG. 16, before the correction, a wall on the left side is misclassified into a floor, but it is detected by the conditional random field that there are walls around this plane, it is thus inferred that the plane information is likely to be wrong. Accordingly, the semantic information of the plane is accurately corrected as a wall.

The association between 3D planes can also be realized by other ways, for example, by a Markov random field.

This embodiment of the present invention provides a hybrid method for determining a plane. During the determination of a plane in multimedia information, a proper method for determining a plane can be adaptively selected according to texture information of each region. In an existing method for determining a plane using Simultaneous Localization And Mapping (SLAM), the effect in determining a region with rich texture is good; while for a texture information absence region (with too less texture information or even no texture information), an accurate result of determination cannot be obtained. For example, for a smooth desktop, glass surface or wall, due to absence of texture information or even no texture information, it is not appropriate to determine a plane using SLAM. In the method for determining a plane based on deep learning as provided in this embodiment of the present invention, for a texture information absence region, information such as a normal vector of a plane and the orientation of a plane can be further determined according to the obtained 3D plane information. Such information is very advantageous for the subsequent rendering of virtual display information, so that the generated AR display information is more real and the user experience is thus improved.

Specifically, before the step of performing region segmentation and depth estimation on multimedia information, the method can further comprise the steps of: determining texture information of the multimedia information, and determining a texture absence region according to the texture information.

Subsequently, for the determined texture absence region, region segmentation and depth estimation are performed by the mode provided in this embodiment of the present invention.

During the determination of texture information of the multimedia information, the number of feature points within a region (the region can be determined according to a user's operation) in the multimedia information can be determined, which determines whether the texture information in this region is rich, and a threshold T is set. When the number of feature points exceeds the threshold T, it is determined that this region is a region with rich texture; and otherwise, it is determined that this region is a texture absence region.

As shown in FIG. 17, a schematic diagram of the hybrid method for determining a plane is shown. For an input image, it is determined whether the texture information is rich. When the texture information is rich, a plane in the image is determined by selecting the method for determining a plane using SLAM. When there is too less texture information or even no texture information, the method for determining a plane based on a deep learning network in this embodiment of the present invention is selected, wherein region segmentation and depth estimation are performed, and 3D plane fitting is performed according to the result of region segmentation and the result of depth estimation to eventually obtain 3D plane information.

The hybrid method for determining a plane can be performed on multimedia information or on a certain region. For example, the hybrid method for determining a plane can be performed on a region in which virtual display information is to be placed by a user (i.e., a region in which virtual display information is to be rendered).

The result of processing of the hybrid method for determining a plane is shown in FIG. 18, where bright points represent texture feature points. Denser texture feature points indicate that the texture information in this region is richer. Two squares in FIG. 18 represent virtual display information. If a user selectively places the squares on a desktop without texture information, in accordance with the steps in FIG. 17, instead of the existing conventional method for determining a plane using SLAM, the method for determining a plane based on a deep learning network should be selected when it is determined that this region has no texture information. In the method for determining a plane based on a deep learning network, the normal vector, orientation, size or other information of the desktop can be obtained, and the rendered AR display information can be more real according to the information and in combination with the virtual display information, so that the user experience is improved.

With the hybrid method for determining a plane, the applicability in different scenes is improved. The method for determining a plane using SLAM is applicable to regions with rich texture, and the method for determining a plane based on deep learning (region segmentation, depth estimation and plane fitting) is applicable to texture absence regions, so that the deficiencies of the method for determining a plane using SLAM are overcome. With the hybrid method for determining a plane, planes in any scene can be estimated, so that the deficiencies of the conventional methods are overcome and the range of application can be expanded greatly due to its advantages.

Compared with a method for determining a 2D plane in the prior art, in this embodiment of the present invention, by performing region segmentation and depth estimation on multimedia information and determining a 3D plane of the multimedia information, the determined 3D plane is more accurate; moreover, by displaying AR display information according to the determined 3D plane information, the reality of the result of AR display can be improved, and the user experience can be further improved.

Embodiment 2

This embodiment of the present invention provides a method for displaying Augmented Reality (AR) display information, as shown in FIG. 19, comprising the following steps.

In step 1001, 3D plane information corresponding to multimedia information is determined; and, in step 1002, AR display information is displayed according to the 3D plane information corresponding to the multimedia information.

In this embodiment of the present invention, the 3D plane information corresponding to the multimedia information can be determined by, but not limited to, the method for determining a plane described in Embodiment 1.

Further, the step 1002 comprises a step 10021 (not shown) and a step 10022 (not shown), wherein, in the step 10021, attribute information belonging to the 3D plane information and/or attribute information belonging to virtual display information is acquired; and, in the step 10022, AR display information is displayed according to the acquired attribute information belonging to the 3D plane information and/or attribute information belonging to virtual display information.

The attribute information corresponding to the 3D plane comprises at least one of semantic information corresponding to the 3D plane information, associated attribute information corresponding to the semantic information, and physical attribute information of the 3D plane.

In this embodiment of the present invention, the attribute information belonging to the 3D plane information and the attribute information corresponding to the virtual display information can be acquired simultaneously to generate AR display information; or, only the attribute information of the virtual display information can be acquired to generate AR display information. For example, when it is determined that the virtual display information is an animal that is able to fly according to the attribute information of the virtual display information, the virtual display information can be displayed at any position. In this case, it is only required to determine the AR display information corresponding to the virtual display information, and it is unnecessary to determine the 3D plane information corresponding to the multimedia information.

The associated attribute information is related to the semantic information and derived from the semantic information, and the semantic information can contain the associated attribute information. For example, if the semantic information is "sea surface", "swimmable" is associated attribute information of the "sea surface".

Further, the physical attribute information can comprise at least one of area, color, contrast, texture or more.

Further, the step of acquiring semantic information corresponding to the 3D plane information comprises any one of a step A (not shown), a step B (not shown) and a step C (not shown).

In the step A, semantic information corresponding to 2D plane information of the multimedia information is used as sematic information of the corresponding 3D plane information; in the step B, semantic information of the 3D plane information is determined according to semantic information corresponding to 2D plane information of the multimedia information and the result of depth estimation of the multimedia information; and, in the step C, semantic analysis is performed on the 3D plane information to obtain semantic information corresponding to the 3D plane information.

In this embodiment of the present invention, context semantic information of the 3D plane information can be determined, and the semantic information corresponding to the 3D plane information is adjusted by the context semantic information, so that the accuracy of the determined semantic information of the 3D plane is improved.

When displaying the AR display information, it is required to determine how to display the virtual display information. In this embodiment of the present invention, a display position of the virtual display information can be automatically recommended. The step 10022 comprises: determining a positional relationship between virtual display information and a 3D plane and/or a positional relationship between pieces of virtual display information according to the acquired attribute information belonging to the 3D plane information and/or attribute information belonging to virtual display information; and, displaying AR display information according to the determined positional relationship.

FIG. 20 shows a schematic view of automatically recommending the display position of the virtual display information. In FIG. 20(a), the 3D plane information acquired from the multimedia information contains a desktop and the ground, and the virtual display information is a teacup. It can be known from the attribute information of the both that, the teacup can be placed on the desktop or on the ground, generally will not be placed on a side wall of the desktop, more commonly placed on the desktop. Therefore, based on the relationship, it is recommended that the teacup is placed on the desktop. In FIG. 20(b), when there are multiple pieces of virtual display information, the relative position relationship between the multiple pieces of virtual display information can also be automatically recommended. For example, if both a display and a keyboard are virtual display information and placed on a desktop, since the case that the keyboard is placed in front of the display is reasonable and common while the case that the keyboard is placed behind the display is uncommon, it is automatically recommended that the keyboard should be placed in front of the display.

The automatic recommendation method can be realized by a knowledge based filtering system and a Long Short Term Memory Network (LSTM). As shown in FIG. 21, multimedia information and virtual display information are determined first; the multimedia information is divided into several regions in form of a grid, and it is attempted to place the virtual display information at a certain position in the grid to randomly construct several combination methods for display information. Some combination methods not conforming to the rules are removed by a knowledge filter, the remaining combination methods are scored by a vertical LSTM and a horizontal LSTM, and the combination method having the highest score is the automatically recommended placement position.

Referring to FIG. 22, region segmentation and depth estimation are performed on the multimedia information by the method provided in this embodiment of the present invention; then, 3D plane fitting is performed according to the result of region segmentation and the result of depth estimation to obtain 3D plane information; and, according to the attribute information corresponding to the 3D plane and/or attribute information belonging to virtual display information, it can be determined that the virtual display information (e.g., a land animal) is able to walk on the ground but is unable to fly in the sky or walk on a wall. Therefore, a plane belonging to the ground can be selected as a fusion object, and the virtual display information faces up and is placed on the ground, so that the situation of directly suspending the virtual display information (e.g., a land animal) in the air in the prior art will not occur. Further, the display size and specific position of the virtual display information in the multimedia information can also be determined according to the actual size of the virtual display information, the distance of the image or more, to avoid the occurrence of the situation of the virtual display information in the generated AR display information being not in conformity with the real situation.

In the method for displaying AR display information provided in this embodiment of the present invention, the display mode (including the position, the size or more) of the virtual display information is comprehensively determined according to the attribute information and/or the attribute information of the 3D plane information, so that the obtained AR display information can fit the real situation closely and the user experience is thus improved.

The solution for automatically recommending the display position of the virtual display information will be described below by taking the furniture placement of a user in the daily life as example.

In this example, the virtual display information can specifically comprise a piece of furniture.

With the solutions in this embodiment of the present invention, the furniture layout preview and the automatically recommended furniture display position can be provided, including the preview of the furniture placement effect, the estimation of a reasonable position for placing a particular piece of furniture, the optimal position for placing the furniture or more.

The furniture placement is a basic life demand of the user. When a piece of furniture needs to be purchased or the overall layout needs to be changed, it is required to conceive in advance how to place the furniture, and then the furniture is placed at the specified position. However, generally, only after the placement is completed, the user can know whether the furniture layout scheme is reasonable or artistic. As a result, it is difficult to realize a satisfactory layout effect, and the cost for layout changes is increased greatly. During each layout change, the user needs to move the furniture to the specified position, so that the manpower and effort consumption of the user is increased greatly. In addition, like trying on clothes, after purchasing the furniture, some users are not satisfied with the actual placement effect of the furniture or there is no proper position for placing the furniture.

In this example, a furniture layout preview can be provided, and the user can preview the layout effect before changing the furniture layout. During the purchase of a piece of furniture, the user can arrange the furniture in advance and then decide whether the furniture is appropriate or whether there is a proper position at home for placing the furniture. Thus, with the recommendation in this example, the user can arrange the furniture at a reasonable or optimal position.

The specific flow of automatically recommending the display position of the virtual display information is shown in FIG. 23.

In step 11, region segmentation and depth estimation are performed on the input multimedia information (an image), 3D plane information corresponding to the multimedia information is determined according to the result of region segmentation and the result of depth estimation, and a 3D plane (e.g., a wall plane, a flooring plane or more) related to the furniture placement is screened according to semantic information of the 3D plane.

The 3D plane information corresponding to the multimedia information comprises semantic information (a wall, a flooring or more) and physical information (size and shape).

In this example, the 3D plane information corresponding to the multimedia information can be determined by, but not limited to, the method for determining a plane described in Embodiment 1.

In step 12, information (including image information, size information or more) about a piece of furniture to be placed is acquired, the 3D plane information is matched with the information about the furniture, and certain screening rules are set, including a semantic matching rule (for example, a table can be placed on a flooring plane but not on a wall) and a size matching rule (for example, the size of the plane must be larger than the size of the furniture). The matched region is a reasonable region for placing the furniture.

The information about the furniture to be placed is acquired by two ways. In the first way, multimedia information containing actual furniture information is acquired, 3D planes of the multimedia information are determined, a plane corresponding to the furniture is extracted separately, and related information (image, size or more) is determined. In the second way, the electronic information (including the image and size) of the furniture is directly provided by a furniture seller.

The reasonable region can be displayed on a screen (the display method can be to highlight the region in a different color) for allowing the user to select a plane for placing the furniture. After the placement plane is determined, the placement plane and the information about the furniture can be fused for previewing.

In step 13, if the user prefers automatic recommendation of the display position of the virtual display information, the optimal placement position within the reasonable region can be automatically recommended with reference to the knowledge.

After the placement plane is determined, the placement plane and the information about the furniture can be fused for previewing. The information about the furniture, as the virtual display information, is displayed at the recommended placement position according to the positional relationship.

FIG. 24 shows a schematic view of automatically recommending the display position of the virtual display information. If the user wants to preview the effect of placing a TV table (virtual display information) in the living room, the user shoots the living room by a mobile phone to obtain multimedia information (a picture) of the living room. The information about the TV table can be provided by the furniture seller. In the step 11, multiple planes (including the ground, a window plane, a TV display screen plane, a wall or more) within the room can be determined by geometric estimation (region segmentation and depth estimation are performed, and corresponding 3D plane information is determined according to the result of region segmentation and the result of depth estimation). Reasonable placement positions in these planes can be found in the steps 11 and 12. For example, it is determined that the ground is a plane in which the table can be placed and the size of the ground is enough to accommodate the table, so that the ground is a reasonable placement position. In the step 13, it is determined based on the knowledge that the TV table is generally placed besides the TV set, so that the recommended optimal placement position is the ground near the TV set. The plane corresponding to the optimal placement position and the information about the furniture are fused for previewing.

If the user selects to place the furniture according to the recommended placement position, the recommended position is selected as a placement position. The user can also select an option for self-defined placement, and can manually select a certain plane as a final placement plane.

Embodiment 3

In this embodiment of the present invention, the step 1002 further comprises: determining a target plane from the 3D plane information corresponding to the multimedia information; determining adjustment information corresponding to the target plane, and, displaying AR display information corresponding to the adjustment information.

The adjustment information can be, but not limited to, adjustment direction information and/or adjustment angle information.

First Example of Embodiment 3

This example provides a method for recommending plane position adjustment, comprising the steps of sensing a positional relationship and providing adjustment information so that the position of the plane satisfies the requirements.

Application scenario: when placing objects such as a piece of furniture, a clock or a picture frame, a user needs to keep the objects to be placed to be horizontal or vertical. For example, the tea table in the living room is parallel to the sofa, the overall indoor layout is designed according to the strict vertical and parallel relationships, and the clock and the picture frame are horizontally placed on the wall. However, a human being has poor ability to sense a vertical relationship and/or a horizontal relationship and is unable to well distinguish a small angle difference, particularly close to an angle of view. Therefore, when placing objects such as a picture frame, the user will often observe at a far distance after the placement and then return to the original placement position for adjustment, or asks someone whether the object is horizontal or vertical. The multiple rounds of adjustments will take additional effort and time of the user, and another person is likely to be needed for assistance. With the method for recommending plane position adjustment in this example, it can be helpful for the user to accurately determine an angle relationship between planes, and the deficiency that a human being is unable to accurately distinguish a small angle difference is overcome. By accurately distinguishing the small angle difference, the horizontal and/or vertical relationship between planes can be determined accurately. Accordingly, the convenience in various aspects such as furniture placement, object placement and indoor layout can be provided, the manpower and effort required by the user for multiple rounds of adjustments are decreased, and the side-effect of perfection of the layout is improved.

In this example, before the step of determining adjustment information corresponding to the target plane, the method further comprises a step of determining, from the 3D plane information corresponding to the multimedia information, a reference plane and a positional relationship between the target plane and the reference plane.

The step of determining adjustment information corresponding to the target plane comprises: determining, according to the determined positional relationship, position adjustment information of the target plane as adjustment information corresponding to the target plane.

The adjustment information is a position adjustment suggestion for the target plane. The target plane is a plane whose position is to be adjusted. The positional relationship between the target plane and the reference plane can contain the current positional relationship, or can contain a target positional relationship. The positional relationship between the target plane and the reference plane can be, but not limited to, an angle between plane edge lines.

In this example, the target plane and/or the reference plane and/or the target positional relationship can be selectively determined by the user. For example, when the user hangs a picture frame on the wall and wants to make the picture frame parallel to the ground or the ceiling, at this time the user can select the picture frame as a target plane and the ceiling as a reference plane, and the target positional relationship is such that the border of the picture frame is parallel to the edge of the ceiling. In addition, the target plane can also be determined by the user and the reference plane or the target positional relationship is automatically determined according to the target plane. For example, if the target plane is a picture frame, since the user usually wants to make the picture frame parallel to the ground or the ceiling when hanging the picture frame, the ground or the ceiling can be automatically used as a reference plane, and the target positional relationship can be set such that the border of the picture frame is parallel to the edge of the ceiling.

FIG. 25 is a schematic flowchart of the method for recommending plane position adjustment in this example.

In step 21, region segmentation and depth estimation are performed on the input multimedia information (an image), and 3D plane information corresponding to the multimedia information is determined according to the result of region segmentation and the result of depth estimation. In step 22, the current positional relationship between the target plane and the reference plane is determined.

The user can manually selects a target plane and a reference plane from 3D planes. For example, an oil painting frame and a ceiling plane are used as a target plane and a reference plane, respectively.

The top border of the plane of the oil painting frame and the edge line of the ceiling are acquired according to the 3D plane information, and an included angle between the top border of the plane of the oil painting frame and the edge line of the ceiling is calculated. This included angle is used as the current positional relationship between the target plane and the reference plane. The included angle can also be used as a planar angle between the target plane and the reference plane. Accordingly, the accurate positional relationship between the target plane and the reference plane can be obtained.

In step 23, adjustment information (a position adjustment suggestion for the target plane) is determined according to the accurate current positional relationship between the target plane and the reference plane as well as the target positional relationship, to assist the user in realizing the position adjustment of the target plane.

Since the user has selected the target plane and the reference plane in the step 22, the user can further select a desired target positional relationship between the target plane and the reference plane, for example, allowing the border of the picture frame to be parallel to the edge of the ceiling. According to the current positional relationship obtained in the step 22, the angle between edge lines of the two planes is 3°. However, since the selected target positional relationship is an angle of 0°, the system automatically gives an adjustment suggestion of rotating the target plane by 3°. Subsequently, the user adjusts the position of the target plane according to the adjustment suggestion, so that the edge lines of the two planes can be parallel to each other and the picture frame can thus be horizontally hung on the wall.

The recommendation of the plane position adjustment in this example is schematically shown in FIGS. 26 and 27.

Referring to FIG. 26, in the daily life, the user is likely to need to horizontally place objects such as a picture frame on the wall; however, since a human being has poor ability to subjectively sense the vertical and horizontal relationship, particularly a small angle (for example, 5°), the user usually hangs the picture frame on the wall first, observe whether the picture frame is horizontal at a far distance and then adjusts the position of the picture frame. Thus, multiple rounds of repetitive adjustment are likely to be required, and there is no guarantee that the picture frame will be placed horizontally.

In this case, the user collects multimedia information (a picture or a video) by a multimedia collection equipment (e.g., a camera) of a terminal (e.g., a mobile phone, a pair of AR glasses or more).

In the step 21, planes in the collected multimedia information can be determined by the method for determining a plane for the user selecting a target plane and a reference plane. The user can click the positions of planes on the screen to select the segmented planes as the target plane and the reference plane. The user can designate, on a display screen of the mobile phone or the display screen of the pair of AR glasses and by touch clicking, the picture frame as the target plane and the ceiling as the reference plane.

After the two planes have been selected, two options HORIZONTAL and VERTICAL can be provided on the display screen. The user can select to keep the two planes in a horizontal or vertical relationship, or can select to keep the edges of the two planes in a horizontal or vertical relationship. When the user selects the option KEEP EDGES HORIZONTAL, it is indicated that the target plane and the reference plane are parallel to each other, that is, the included angle between the top border of the plane of the oil painting frame and the edge line of the ceiling is 0°. It can be known from the step 22 that the current positional relationship between the two planes is: the included angle between the top border of the plane of the oil painting frame and the edge line of the ceiling is 5°.

Since the target included angle is 0° and the current included angle is 5°, the two planes are not parallel, so that there will be a prompt on the display screen that the angle between the edge lines of the planes selected by the user is equal to 5°.

Based on the adjustment suggestion obtained in the step 23, the target plane is rotated counterclockwise by 5° on the wall. After the picture frame is adjusted according to the adjustment suggestion, the included angle between the top border of the plane of the oil painting frame and the edge line of the ceiling can be 0°. The user can be prompted with the adjustment suggestion by words on the display screen, by a voice broadcast or in other ways, to instruct the user to "rotate counterclockwise by 5°" according to the current adjustment suggestion.

In this example, after the user has selected the target plane, the reference plane and the target positional relationship between the planes, the positional relationship between the target plane and the reference plane can be acquired periodically, and the adjustment suggestion can also be provided.

After the user performs rotation according to the adjustment suggestion, the user can perform continuous shooting by the mobile phone or the pair of AR glasses to determine a change in the positional relationship in real time. For example, if the user rotates by a too large angle, for example, counterclockwise by 7°, the system will re-estimate the current positional relationship and prompt the user to rotate clockwise by 2°, and the system will not give any prompt when the target positional relationship is realized.

In this example, the current positional relationship can also be estimated in real time. In this case, during the adjustment, the current scene is continuously shot by the mobile phone or the pair of AR glasses. The user can slowly rotate the oil painting, and the current positional relationship is displayed in real time. When the target positional relationship is realized, the adjustment completion is prompted by the display screen or voice.

Referring to FIG. 27, if the user needs to make a sofa vertical to the wall, it is difficult to ensure a vertical relationship since the soft does not directly adjoin the wall. Thus, like FIG. 26, the current scene is shot by a mobile phone or a pair of AR glasses to obtain multimedia information. The user selects a side face of the sofa and the wall as a target plane and a reference plane, respectively, and selects a target spatial relationship such that the bottom edge line of the side face of the sofa is vertical to the edge line of the wall, that is, the included angle between the bottom edge line of the side face of the sofa and the edge line of the wall is 90°. The current positional relationship between the side face of the sofa and the wall (i.e., the current included angle between the bottom edge line of the side face of the sofa and the edge line of the wall) can be obtained in the step 2. The system determines an angle to be adjusted, and prompts, by the display screen or voice, the user to adjust according to the adjustment suggestion until the target positional relationship is realized.

In addition, the method can also be implemented in a simple way. The wall is selected as a reference plane and no target plane is selected. A normal vector of the wall is obtained, and a line of the normal vector is displayed on the display screen. The user continuously obverses the display screen and place the sofa along the line of the normal vector.

Second Example of Embodiment 3

This example provides a method for recommending attitude adjustment of a collection equipment, by which a user can be prompted to adjust the attitude of a multimedia collection equipment (e.g., a camera, a mobile phone or more) to obtain an optimal collection angle.

Application scenario: when the user takes a picture by a camera or a mobile phone, for a particular object, the user expects to take some front-view pictures, for example, when the user takes a picture of a file, an oil painting or more. If the obtained picture has a rotation angle or an angle of inclination, it is inconvenient for subsequent reading. However, it is not intuitive for the user how to adjust the attitude of the camera to obtain front-view pictures.

In this example, an attitude adjustment suggestion for the collection equipment can be presented on the display screen by analyzing the collected multimedia information, and the user rotates or moves the collection equipment according to the adjustment suggestion to obtain front-view multimedia information.

In this example, before the step of determining adjustment information corresponding to the target plane, the method further comprises a step of determining a positional relationship between the target plane and a collection plane belonging to the collection equipment for collecting the multimedia information.

The step of determining adjustment information corresponding to the target plane comprises: determining, according to the determined positional relationship, attitude adjustment information of the collection plane as adjustment information corresponding to the target plane.

The target plane is a plane corresponding to an object to be shot.

In the following examples, the target plane can specifically be a plane corresponding to an object to be shot, for example, a file, an oil painting or more.

The collection equipment for collecting the multimedia information can specifically be a camera, a mobile phone or more in the following embodiments, and the collection plane corresponding to the collection equipment for collecting the multimedia information can specifically be a plane corresponding to the camera or the mobile phone in the following embodiments.

When the adjustment information is angle information, in the following examples, the angle information can specifically comprise an adjustment rotation angle and/or an angle of inclination.

FIG. 28 is a schematic flowchart of the method for recommending attitude adjustment of a collection equipment in this example.

In step 31, region segmentation and depth estimation are performed on the input multimedia information (e.g., an image), and 3D plane information corresponding to the multimedia information is determined according to the result of region segmentation and the result of depth estimation.

The user can manually select a target plane from 3D planes. For example, during shooting an oil painting, the plane of the oil painting is used as a target plane.

In step 32, relative normal vector information of the target plane relative to the collection plane is determined.

If the positional relationship between the target plane and the collection plane is a parallel relationship, that is, the target plane is collected in a front-view direction, the value of the relative normal vector in the 3D space is a fixed standard value (e.g., 1,0,0); if the target plane is not parallel to the collection plane, it can be considered that the target plane is being rotated and then collected, and in this case, the value of the relative normal vector is one other value.

The positional relationship between the target plane and the collection plane can be determined by the relative normal vector information.

In step 33, attitude adjustment information (i.e., an attitude adjustment suggestion) of the collection plane can be determined according to the positional relationship between the target plane and the collection plane, wherein the attitude adjustment information can specifically be an adjustment direction and/or an adjustment angle.

In this case, the adjustment angle can be a rotation angle. A rotation indication (containing a rotation direction and a rotation angle) can be displayed on the display screen, and the user can obtain the front-view target plane after adjusting the collection equipment according to the rotation indication.

In addition, the positional relationship between the target plane and the collection plane can also be determined according to the edge line of the target plane and the edge line of the collection plane. If the included angle between the two planes is not 0°, it can be considered that the target plane is being inclined and then collected, and the attitude adjustment information (i.e., an attitude adjustment suggestion) of the collection plane can be determined according to the positional relationship between the target plane and the collection plane. The attitude adjustment information can specifically be an adjustment direction and/or an adjustment angle. In this case, the adjustment angle can be an angle of inclination. An inclination indication (containing an inclination direction and an angle of inclination) can be displayed on the display screen, and the user can obtain the front-view target plane after adjusting the collection equipment according to the inclination indication.

FIG. 29 shows a schematic view of the method for recommending attitude adjustment of a collection equipment in this example. The user activates a camera of a mobile phone, where the acquired image is shown in FIG. 29(a). In this case, there is an oil painting in the image, but the oil painting has a certain rotation angle. If the user is not satisfied with the shooting result, the user can select a front-view mode. In this mode, plane information is acquired in the step 31 to obtain an oil painting plane. In the step 32, a relative normal vector of the oil painting plane is obtained. If the relative normal vector of the oil painting plane is not a fixed standard value, it can be automatically determined that the shot image has a rotation angle. According to the rotation angle and in combination with the attitude of the camera, a camera attitude adjustment suggestion of rotating the camera in an opposite direction according to the rotation angle is obtained. The adjustment suggestion can be displayed in the display screen. As shown in FIG. 29(b), the user can obtain a front-view image by rotating the camera according to the adjustment suggestion, wherein, when the user adjusts the camera according to the adjustment suggestion, the system can update the current angle condition in real time. When the relative normal vector is a fixed standard value, the user can be prompted with the adjustment completion, as shown in FIG. 29(c).

Similarly, as shown in FIGS. 29(d), 29(e) and 29(f), when the included angle between edge lines of the target plane (a file) and the collection plane is not 0°, it is inconvenient for the user to view. In this case, the user can be recommended to incline the mobile phone according to the adjustment suggestion, so that the front-view content can be shot.

In this example, the inclination of the collection equipment means that the collection equipment is moved within a plane where the collection plane is located, and the rotation of the collection equipment means that the roll, pitch and yaw angles are adjusted by using the center of the collection equipment as an original point.

Embodiment 4

In this embodiment of the present invention, the step 1002 further comprises: determining a driving evasion plane from the 3D plane information corresponding to the multimedia information; determining driving assistance information according to the driving evasion plane; and, displaying AR display information corresponding to the driving assistance information.

First Example of Embodiment 4

This example provides a method for determining whether it is wide enough for a vehicle to pass through in a driving assistance system. By this method, assistance information about whether it is wide enough for a vehicle to pass when the vehicle is going to pass through a narrow region can be provided.

A common problem is to be solved when driving a vehicle. When a vehicle is going to pass through a narrow lane or alley, a user needs to estimate the accurate width of a passable lane to determine whether the vehicle can successfully pass through the lane or alley. However, the estimation of the width is often rough, or even the width of the vehicle and the lane width is likely to be wrongly estimated due to some inherent visual defect of the human being. In this example, with the help of the machine vision, a more accurate result of visual estimation is provided, and assistance information (e.g., the width of the vehicle, lane width, whether it is wide enough for the vehicle to pass through or not, or more) is provided to the user, so that it is helpful for the user to determine whether the vehicle can pass through the narrow region ahead. Further, this solution can be applied to a driving assistance system or an automatic driving system, so that one of problems in the automatic driving is solved.

If the driving evasion plane is a barrier plane on two sides of a driving road, the step of determining driving assistance information according to the driving evasion plane comprises: determining, according to the barrier plane on two sides of the driving road, width information of the driving road; and, determining, according to the width information of the driving road, prompt information indicating whether the driving road is wide enough for a vehicle to pass through, as the driving assistance information.

The barrier plane on two sides of the driving road can specifically be a plane on two sides of an alley or a barrier plane on two sides of a narrow lane in the following embodiments, or can be a plane corresponding to a wall or other vehicles or more.

The specific process is shown in FIG. 30.

In step 41, 3D plane information corresponding to multimedia information is determined.

In this example, the 3D plane information corresponding to the multimedia information can be determined by, but not limited to, the method for determining a plane described in Embodiment 1.

In step 42, a barrier plane on two sides of a driving road (e.g., walls on two sides of the driving road, a side plane of other vehicles or more) is determined according to semantic information of the acquired 3D plane, and width information (also referred to as road width or actual road width) of the driving road is calculated.

During the determination of the barrier plane, a plane closest to the current vehicle is to be determined. For example, when there are other vehicles on two sides of the driving road, a plane where the rearview mirror of another vehicle is located can be used as a barrier plane.

In step 43, whether it is wide enough for the vehicle to pass through is determined according to the actual road width and the attributes of the vehicle (e.g., the width of the vehicle, i.e., vehicle width), and when the actual road width is larger than the width of the vehicle, the user can be prompted that it is wide enough for the vehicle to pass through.

Referring to FIG. 31, the driving assistance system shoots the front road information by a front camera to obtain an image of the front road condition. In the step 41, each plane in the image of the front road can be detected. In the step 42, the actual road width can be calculated. In the step 43, driving assistance prompt information about whether it is wide enough for the vehicle to pass through is obtained by comparing the actual road width with the width of the vehicle. The prompt information can be used as the recommended content, and prompted to the user by voice broadcasting or displaying on a screen mounted in the vehicle.

Second Example of Embodiment 4

This example provides a method for estimating a road condition in a driving assistance system. By this way, the front road condition can be automatically determined when driving a vehicle so as to obtain a driving assistance prompt.

In an automatic driving or driving assistance system, determining the front road condition is a basic requirement, and the driving speed is adjusted timely according to the front road condition. Due to the absence of the basic determination of the front road condition, it is likely to result in disastrous accidents.

For example, if the front road condition is poor and there are lots of pits, the driving speed needs to be reduced. If the vehicle is still driven at a full speed, it is very likely to result in traffic accidents. In this example, the purpose of estimating the road condition can be realized simply by an inexpensive common optical camera, so as to determine whether the front road is flat and whether the speed needs to be reduced.

If the driving evasion plane is a plane to be evaded on a driving road, the step of determining driving assistance information according to the driving evasion plane comprises: determining, according to the plane to be evaded on the driving road, driving suggestion information as the driving assistance information.

In the following embodiments, the plane to be evaded can be a plane that is not appropriate for a vehicle to pass through, for example, a water surface, a pitted plane, a barrier plane or more.

The specific process is shown in FIG. 32.

In step 51, 3D plane information corresponding to multimedia information is determined.

In this example, the 3D plane information corresponding to the multimedia information can be determined by, but not limited to, the method for determining a plane described in Embodiment 1.

In step 52, a driving road and other planes that are not appropriate for a vehicle to pass through (e.g., a water surface, a pitted plane and a barrier plane) are extracted according to the acquired 3D plane information, and the planes are classified in terms of the level of hazard according to the depth information of the planes, where a shallow pit belongs to the low level of hazard, and a deep pit, lot of water and a high barrier belong to the high level of hazard.

In step 53, according to the level of hazard, the front hazard condition is estimated, and driving suggestion information (i.e., a driving suggestion) is provided, wherein the driving suggestion can be a hazard prompt or a re-planned driving route.

The hazard condition can be obtained according to the level of hazard of the related plane, the area of the related plane and the comprehensive score. The scoring rule can be as follows: weighting according to the level of hazard and the size of the related plane, setting several score thresholds, and giving different hazard prompts after a certain threshold is exceeded. For example, if there are some pits in front, since the level of hazard of the pits is low and the area of the pits is small, a low-level hazard prompt is given after the comprehensive scoring to prompt the driver to slow down. If there are lots of barriers in front, since the level of hazard of the barriers is high and the barriers are large in area and numerous, a high hazard prompt is given after the comprehensive scoring to prompt the driver to stop and check the condition.

In addition, a driving route can be re-planned according to the front road condition.

The hazard prompt obtained in the step 53 comprises SLOW DOWN and BYPASS. When the driving suggestion is BYPASS, the route needs to be re-planned to evade a barrier region in front. In this example, the information about the plane to evaded, the road information or more can be provided for the route planning.

Referring to FIG. 33, the automatic driving system shoots front road information by a front camera to obtain upper and lower pictures of the left side. In the upper picture of the left side, after the steps 51 and 52, related planes (including a water surface and a road surface) can be obtained. By the hazard classification, the small-area water surface is classified into an intermediate hazardous barrier, and the obtained estimation is EVADE AND BYPASS. Subsequently, the driving route is re-planned, and the hazard prompt information and the re-planned driving route are displayed to the user, as shown in the figure on the upper right of FIG. 33. Similarly, in the figure on the lower left of FIG. 33, information such as the road surface and a shallow pit plane is obtained. In the hazard classification, the shallow pit plane belongs to the low level of hazard. Meanwhile, since no evasion route can be planned based on the front road condition, the user can be prompted to slow down.

Embodiment 5

This example provides a method for realizing an AR keyboard. With the help of an AR equipment, a keyboard in English can be converted into a multi-language keyboard, and a common password keyboard can be converted into an encrypted password keyboard. A common keyboard is generally a keyboard in English. However, for a user in a different language, a keyboard in a particular language is generally required, for example, a keyboard in Russian and a keyboard in Korean. Moreover, since keyboards in other languages are more difficultly obtained than keyboards in English, it is very inconvenient for users. Even if a user have several keyboards in different languages, it is also very inconvenient to switch between keyboards when words in multiple languages need to be entered. In addition, when entering a password, a random password keyboard is often safer than a fixed password keyboard. Random password keyboards have been widely applied to the online transaction. However, in the case of offline transaction (swiping cards and withdrawal), a physical password keyboard (which is still a fixed password keyboard) needs to be used. Thus, if the password is glimpsed by others when the user is entering the password, an account safety risk will be caused.

The AR keyboard in this example can be used as a multi-language keyboard, and a switchable multi-language keyboard can be presented according to the AR presentation mode. The AR keyboard can also be used as a random password keyboard. An encrypted password keyboard is presented in an AR manner according to a coding rule. The encrypted password keyboard only can be seen by the user, and the real password cannot be obtained even if the encrypted password keyboard is seen by others around.

In this embodiment of the present invention, the step 1002 further comprises: determining, from the 3D plane information corresponding to the multimedia information, planes for which virtual display information is to be displayed; acquiring virtual display information belonging to each plane for which virtual display information is to be displayed respectively; and, displaying AR display information corresponding to the virtual display information.

The planes for which virtual display information is to be displayed are planes whose semantic information is a key, and the virtual display information is key value information.

The method further comprises the steps of: detecting a user's operation to a 3D plane in the multimedia information; determining a user's operation instruction according to actual display information and virtual display information in the 3D plane corresponding to the operation; and, executing a corresponding operation according to the user's operation instruction.

In the following examples, the plane of a key can specifically be a plane where the key is located in the keyboard. The keyboard can be a common keyboard or a password keyboard.

FIG. 34 shows a flowchart of the method for realizing an AR keyboard in this example.

In step 61, 3D plane information corresponding to multimedia information is determined, and key planes are screened according to the obtained 3D plane information.

In this example, the 3D plane information corresponding to the multimedia information can be determined by, but not limited to, the method for determining a plane described in Embodiment 1.

During the screening of the key planes, according to a screening rule, planes whose semantic information is a key are reserved, and other irrelevant planes are removed.

Digital modeling can also be performed on a keyboard according to the keyboard layout, to obtain 3D digital model information of a real keyboard.

In step 62, the key value of an original keyboard key is replaced with specified virtual display information, that is, virtual display information corresponding to each key plane of the original key to be replaced is acquired first, and the virtual display information is rendered at the position of the key plane to obtain AR display information. The virtual display information can be the replaced key value information.

When the original key is a language key, the multi-language keyboard function can be realized by replacing key values in different languages. When the original key is a password key, the function of the random password keyboard can be realized by replacing the key value.

By using the 3D plane information, the virtual display information can be better rendered at the position of the key plane, so that the eventually obtained AR virtual keyboard is much real.

Since the key value of the key is replaced, when a user's operation to the key is detected, the replaced virtual display information (i.e., the replaced key value) corresponding to the key can be determined; then, the user's real operation instruction is determined according to the replaced key value; and, the corresponding operation is executed according to the user's real operation instruction.

For example, during the realization of a random password keyboard by using an AR virtual keyboard, when the user presses a password on the password keyboard, the bank system or the password keyboard will decrypt, according to the key value before the replacement and the key value after replacement, the user's password to obtain the user's real password, so that the transaction is completed.

The AR keyboard comprises a multi-language AR keyboard and an encrypted password keyboard. FIG. 35 shows a schematic view of the multi-language AR keyboard. In FIG. 35(a), the real keyboard is a keyboard in English; and, by using an AR equipment (e.g., a mobile phone or a pair of AR glasses), the keyboard is displayed on an AR equipment as a keyboard in Russian, as shown in FIG. 35(b).

FIG. 36 shows a schematic view of the encrypted password keyboard. By an AR equipment, the encrypted password keyboard is displayed on the AR equipment, and the contents of the encrypted password keyboard are different from the contents of the real keyboard seen by others.

This embodiment of the present invention provides a method for displaying AR display information. Compared with the prior art, in this embodiment of the present invention, attribute information belonging to the 3D plane information and/or attribute information belonging to virtual display information can be acquired by using the determined 3D plane information corresponding to the multimedia information, and AR display information is displayed according to the two pieces of information. For example, it can be determined that the attribute information corresponding to the 3D plane is the ground and a water surface and the attribute information corresponding to the virtual display information is a land animal and an aquatic animal; and then, according to the two pieces of attribute information, the AR information can be displayed by adding the land animal on the ground and adding the aquatic animal onto the water surface, so that the situation of the land animal being on the water surface or the aquatic animal being on the ground in the displayed virtual reality information is avoided. Accordingly, the reality of the result of AR display can be improved, and the user experience can be further improved.

An embodiment of the present invention provides a device for determining a plane, as shown in FIG. 37, comprising: a processing module 3701 and a first determining module 3702.

The processing module 3701 is configured to perform region segmentation and depth estimation on multimedia information.

The first determining module 3702 is configured to determine, according to the result of region segmentation and the result of depth estimation obtained by the processing module 3701, 3D plane information of the multimedia information.

The device for determining a plane in this embodiment of the present invention can implement the method embodiments described above, and the specific function implementations refer to the descriptions in the method embodiments and will not be repeated here.

An embodiment of the present invention provides a device for displaying Augmented Reality (AR) display information, as shown in FIG. 38, comprising: a second determining module 3801 and a displaying module 3802.

The second determining module 3801 is configured to determine 3D plane information corresponding to multimedia information.

The displaying module 3802 is configured to display AR display information according to the 3D plane information corresponding to the multimedia information determined by the second determining module 3801.

This embodiment of the present invention provides a device for displaying AR display information. Compared with the prior art, in this embodiment of the present invention, attribute information belonging to the 3D plane information and/or attribute information belonging to virtual display information can be acquired by using the determined 3D plane information corresponding to the multimedia information, and AR display information is generated according to the two pieces of information. For example, it can be determined that the attribute information corresponding to the 3D plane is the ground and a water surface and the attribute information corresponding to the virtual display information is a land animal and an aquatic animal; and then, according to the two pieces of attribute information, the AR information can be generated by adding the land animal on the ground and adding the aquatic animal onto the water surface, so that the situation of the land animal being on the water surface or the aquatic animal being on the ground in the generated virtual reality information is avoided. Accordingly, the result of AR display can be improved, and the user experience can be further improved.

The device for displaying AR display information in this embodiment of the present invention can implement the method embodiments described above, and the specific function implementations refer to the descriptions in the method embodiments and will not be repeated here.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by those skilled in the art that the present invention involves devices for carrying out one or more of operations as described in the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be noted that, to a person of ordinary skill in the art, various improvements and modifications can be made without departing from the principle of the present invention, and these improvements and modifications shall be regarded as falling into the protection scope of the present invention.

The invention claimed is:

1. A method for determining a plane, the method comprising:
    performing region segmentation on multimedia information using a unified deep learning network trained by plane labeling and semantic labeling to simultaneously obtain two-dimensional (2D) plane information and semantic information corresponding to the 2D plane information;
    performing depth estimation on the multimedia information; and
    determining, based on a result of the region segmentation and a result of the depth estimation, three-dimensional (3D) plane information of the multimedia information.

2. The method of claim 1, wherein the plane labeling is using a plane as a unit to label pixel points belonging to each plane in an image as identical plane information.

3. The method of claim 1, wherein the semantic labeling is using a semantic object as a unit to label the semantic object at a specific position in the multimedia information.

4. The method of claim 1, wherein performing the region segmentation and the depth estimation on the multimedia information comprises:
    correcting the result of depth estimation based on the result of region segmentation; and/or
    correcting the result of region segmentation based on the result of depth estimation.

5. The method of claim 1, further comprising:
    adjusting the determined 3D plane information based on the semantic information and the spatial relationship information corresponding to the determined 3D plane information.

6. The method of claim 5, wherein adjusting the determined 3D plane information comprises:
    determining, based on the semantic information and the spatial relationship information corresponding to the determined 3D plane information, an association between 3D planes, and adjusting the determined 3D plane information by using the determined association.

7. The method of claim 1 further comprising:
    determining texture information of the multimedia information, and determining a texture absence region based on the texture information,
    wherein the region segmentation and the depth estimation are performed for the determined texture absence region.

8. A method for displaying augmented reality (AR) display information, the method comprising:
determining three-dimensional (3D) plane information corresponding to multimedia information; and
displaying the AR display information based on the 3D plane information corresponding to the multimedia information,
wherein displaying the AR display information comprises:
acquiring at least one of attribute information of the 3D plane information and attribute information of virtual display information; and
displaying the AR display information based on the at least one of acquired attribute information of the 3D plane information or attribute information of virtual display information,
wherein the attribute information belonging to the 3D plane information comprises at least one of the following: semantic information corresponding to the 3D plane information, associated attribute information corresponding to the semantic information, and physical attribute information of the 3D plane.

9. The method of claim 8, wherein acquiring the at least one of attribute information of the 3D plane information and attribute information of virtual display information comprises the semantic information corresponding to the 3D plane information, and further comprising:
using semantic information corresponding to 2D plane information of the multimedia information as the semantic information corresponding to the 3D plane information; or
determining, based on the semantic information corresponding to the 2D plane information of the multimedia information and depth estimation of the multimedia information, semantic information corresponding to the 3D plane information; or
performing semantic analysis on the 3D plane information to obtain the semantic information corresponding to the 3D plane information.

10. The method of claim 8, wherein displaying the AR display information further comprises:
determining, based on the at least one of acquired attribute information of the 3D plane information and attribute information of the virtual display information, at least one of a positional relationship between the virtual display information and the 3D plane information and a positional relationship between pieces of the virtual display information; and
displaying the AR display information based on the determined positional relationship.

11. The method of claim 8, wherein displaying the AR display information further comprises:
determining a target plane from the 3D plane information corresponding to the multimedia information;
determining adjustment information corresponding to the target plane; and
displaying the AR display information corresponding to the adjustment information,
wherein the adjustment information is at least one of adjustment direction information and adjustment angle information.

12. The method of claim 11, further comprising:
determining a reference plane and a positional relationship between the target plane and the reference plane from the 3D plane information corresponding to the multimedia information,
wherein determining the adjustment information corresponding to the target plane comprises:
determining, based on the determined positional relationship, position adjustment information of the target plane as adjustment information corresponding to the target plane.

13. The method of claim 11, further comprising:
determining a positional relationship between the target plane and a collecting plane belonging to a collecting equipment for collecting the multimedia information,
wherein determining the adjustment information corresponding to the target plane comprises:
determining, based on the determined positional relationship, attitude adjustment information of the collecting plane as adjustment information corresponding to the target plane.

14. The method of claim 8, wherein, displaying the AR display information further comprises:
determining a driving evasion plane from the 3D plane information corresponding to the multimedia information;
determining driving assistance information based on the driving evasion plane; and
displaying the AR display information corresponding to the driving assistance information.

15. The method of claim 14, wherein the driving evasion plane is a barrier plane on two sides of a driving road,
wherein determining the driving assistance information based on the driving evasion plane comprises:
determining, based on the barrier plane on two sides of the driving road, width information of the driving road; and
determining, according to the width information of the driving road, prompt information indicating whether the driving road is wide enough for a vehicle to pass through, as the driving assistance information.

16. The method of claim 14, wherein the driving evasion plane is a plane to be evaded on a driving road, and
wherein determining the driving assistance information based on the driving evasion plane comprises:
determining, based on the plane to be evaded on the driving road, driving suggestion information as the driving assistance information.

17. The method of claim 8, wherein displaying the AR display information further comprises:
determining, from the 3D plane information corresponding to the multimedia information, planes for which virtual display information is to be displayed;
acquiring the virtual display information belonging to each plane for which the virtual display information is to be displayed;
displaying the AR display information corresponding to the virtual display information;
detecting an operation to a 3D plane in the multimedia information;
determining, based on actual display information and virtual display information in the 3D plane corresponding to the operation, an operation instruction; and
executing a corresponding operation based on the operation instruction,
wherein the planes for which virtual display information is to be displayed are planes whose semantic information is a key, and the virtual display information is key value information.

18. A device for determining a plane, comprising:
a processing module configured to:
perform region segmentation on multimedia information using a unified deep learning network trained by plane labeling and semantic labeling to simultaneously obtain two-dimensional (2D) plane information and semantic information corresponding to the 2D plane information; and perform depth estimation on the multimedia information; and a first determining module configured to determine, based on a result of the region segmentation and a result of the depth estimation obtained by the processing module, three-dimensional (3D) plane information of the multimedia information.

19. A device for displaying Augmented Reality (AR) display information, comprising:

a processing module configured to:

determine three-dimensional (3D) plane information corresponding to multimedia information; and display the AR display information based on the 3D plane information corresponding to the multimedia information determined by the second determining module, wherein the displaying the AR display information comprises:

acquiring at least one of attribute information of the 3D plane information and attribute information of virtual display information; and displaying the AR display information based on the at least one of acquired attribute information of the 3D plane information or attribute information of virtual display information, wherein the attribute information belonging to the 3D plane information comprises at least one of the following: semantic information corresponding to the 3D plane information, associated attribute information corresponding to the semantic information, and physical attribute information of the 3D plane.

* * * * *